United States Patent
Kumar et al.

(10) Patent No.: US 10,287,511 B2
(45) Date of Patent: May 14, 2019

(54) CATALYST COMPOSITION FOR FLUID CATALYTIC CRACKING, AND USE THEREOF

(71) Applicant: Hindustan Petroleum Corporation Ltd., Mumbai (IN)

(72) Inventors: Pramod Kumar, Bangalore (IN); Somanath Kukade, Bangalore (IN); Hrishikesh Shriram Shidhaye, Bangalore (IN); Venkata Chalapathi Rao Peddy, Bangalore (IN); Venkateswarlu Choudary Nettem, Bangalore (IN); Sriganesh Gandham, Viskhapatnam (IN)

(73) Assignee: Hindustan Petroleum Corporation Ltd., Mumbai (IN)

( * ) Notice: Subject to any disclaimer, the term of this patent is extended or adjusted under 35 U.S.C. 154(b) by 0 days.

(21) Appl. No.: 15/535,736

(22) PCT Filed: Jun. 3, 2016

(86) PCT No.: PCT/IN2016/050167
§ 371 (c)(1),
(2) Date: Jun. 14, 2017

(87) PCT Pub. No.: WO2016/199164
PCT Pub. Date: Dec. 15, 2016

(65) Prior Publication Data
US 2018/0002612 A1    Jan. 4, 2018

(30) Foreign Application Priority Data
Jun. 9, 2015   (IN) .......................... 2222/MUM/2015

(51) Int. Cl.
*C10G 11/05* (2006.01)
*C10G 11/18* (2006.01)
(Continued)

(52) U.S. Cl.
CPC ............. *C10G 11/05* (2013.01); *B01J 29/084* (2013.01); *B01J 29/088* (2013.01); *B01J 29/40* (2013.01);
(Continued)

(58) Field of Classification Search
CPC . B01J 29/08; B01J 29/088; B01J 29/10; B01J 29/12; B01J 29/14; B01J 29/16; B01J 29/40; B01J 29/42; B01J 29/44; B01J 29/46; B01J 29/48; B01J 35/1057; B01J 37/0045; C10G 11/05; C10G 11/18
See application file for complete search history.

(56) References Cited

U.S. PATENT DOCUMENTS 3,702,886 A * 11/1972 Argauer et al. ........ B01J 20/186
                                                       208/111.01
4,239,654 A    12/1980 Gladrow et al.
(Continued)

FOREIGN PATENT DOCUMENTS

| CN | 103506155 A | 1/2014 |
|---|---|---|
| EP | 1762299 A1 | 3/2007 |
| WO | WO-93/01256 A1 | 1/1993 |

OTHER PUBLICATIONS

Search Report and Written Opinion in International Application No. PCT/IN2016/050167 dated Oct. 31, 2016, 10 pages.

*Primary Examiner* — Brian A McCaig
(74) *Attorney, Agent, or Firm* — Marshall, Gerstein & Borun LLP

(57) ABSTRACT

In accordance with the present subject matter there is provided a catalyst composition including 70-98% of a non-zeolitic material; and 2-30% of at least one zeolite material, the percentage being based on weight of the catalyst composition. The subject matter also relates to a method for preparation of the catalyst composition. The subject matter further relates to a process for the fluid catalytic cracking of a hydrocarbon feedstock.

21 Claims, 1 Drawing Sheet

(51) Int. Cl.
*C10G 51/02* (2006.01)
*B01J 29/08* (2006.01)
*B01J 29/40* (2006.01)
*B01J 29/80* (2006.01)
*B01J 35/10* (2006.01)
*B01J 37/00* (2006.01)

(52) U.S. Cl.
CPC ........... *B01J 29/80* (2013.01); *B01J 35/1057* (2013.01); *B01J 37/0045* (2013.01); *C10G 11/18* (2013.01); *C10G 51/02* (2013.01); *B01J 2229/16* (2013.01); *C10G 2400/20* (2013.01); *Y02P 30/20* (2015.11)

(56) References Cited

U.S. PATENT DOCUMENTS

| | | | |
|---|---|---|---|
| 4,980,053 A | 12/1990 | Li et al. | |
| 5,194,412 A * | 3/1993 | Roberie | B01J 29/06 502/64 |
| 5,382,351 A * | 1/1995 | Miller | B01J 29/40 208/120.01 |
| 5,702,589 A | 12/1997 | Tsang et al. | |
| 5,846,402 A | 12/1998 | Mandal et al. | |
| 6,093,867 A | 7/2000 | Ladwig et al. | |
| 6,656,346 B2 | 12/2003 | Ino et al. | |
| 7,611,622 B2 | 11/2009 | Niccum et al. | |
| 2007/0102322 A1 | 5/2007 | Wang | |
| 2013/0317271 A1 | 11/2013 | Al-Ghrami et al. | |
| 2014/0014555 A1 | 1/2014 | Marri et al. | |

* cited by examiner

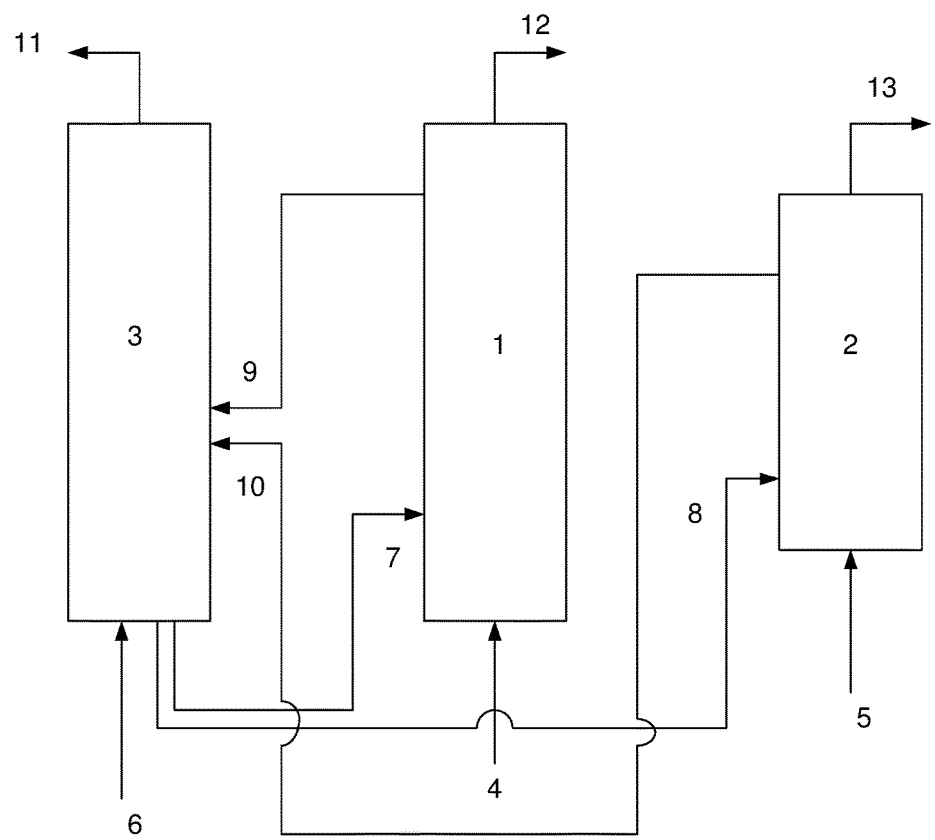

CATALYST COMPOSITION FOR FLUID CATALYTIC CRACKING, AND USE THEREOF

TECHNICAL FIELD

The subject matter described herein in general relates to a catalyst composition including a non-zeolitic material; and at least one zeolite material. The subject matter also relates to a method for preparation of the catalyst composition. The subject matter further relates to a process for the fluid catalytic cracking of a hydrocarbon feedstock to obtain light olefins.

BACKGROUND

A fluidized catalytic cracking (FCC) unit is the most important secondary processing unit in a refinery for cracking gas oil or residual feedstocks and is considered as the work horsepower of a refinery. FCC units operate either on maximum gasoline mode or the maximum diesel mode, which depends on seasonal product demand FCC units are gaining vitality now days, since it can be operated in high severity mode to produce high yields of light olefins than conventional FCC operation. The olefins produced in FCC unit are also an important source for petrochemicals.

The FCC unit comprises the reactor and regenerator, which are considered to be the core element of the fluid catalytic cracking unit. The preheated hydrocarbon feedstock is injected into the riser where it is vaporized and cracked into smaller molecules by contact with the hot catalyst from the regenerator. The hydrocarbon vapours fluidize the catalyst in the riser and the mixture of hydrocarbon vapours and catalyst flow upward to enter the reactor. The reactor is a disengaging vessel in which the cracked product vapours are separated from the spent catalyst. The separated spent catalyst flows through a steam stripping section to remove any hydrocarbon vapours before the spent catalyst returns to the regenerator. The spent catalyst having coke deposited on it is regenerated by burning off coke with air into the regenerator. The combustion of the coke is exothermic, which heats the regenerated catalyst and provides the heat required for the vaporization of the hydrocarbon feedstock and the endothermic cracking reactions that take place in the riser. The hot flue gas exits the regenerator after separation of entrained catalyst particles in the cyclones.

FCC units typically produce around 3-5 wt % propylene, depending on feedstock type, operating conditions such as riser outlet temperature, reactor pressure, catalyst-to-oil ratio and the type of FCC catalysts/additives. Usage of both ZSM-5 additive and increased operation severity increases the light olefin yield from the FCC unit at the expense of gasoline.

The prime source of ethylene and propylene is steam crackers. However due to the focus shift of naphtha crackers to ethane crackers, propylene production has suffered. Therefore, enhancing the propylene yield from FCC is one of the ways to meet the propylene demand in the market.

U.S. Pat. No. 4,980,053 describes deep catalytic cracking (DCC) process for catalytic cracking of VGO with mixed solid acid catalyst to produce propylene and butylene at very low weight hourly space velocity (WHSV) of 0.2 to 20 hr$^{-1}$, catalyst/oil of 2-12 wt/wt and temperature of 500 to 620° C. The LPG yield obtained is 30 to 45 wt %. However, the drawback of the process is high dry gas yield (6-12 wt %). Further, high severity operation requires additional source to build coke on catalyst to meet heat balance requirements for riser and dense bed cracking. Also, the reactor size is more than conventional FCC reactor due to WHSV.

U.S. Pat. No. 5,846,402 describes the process for the production of high yield of LPG and light olefins in the range of C3 and C4 from various petroleum fractions including residues through very high severity catalytic cracking using a metal resistant mixed catalyst system. The reactor operates at a WHSV of 40-120 hr$^{-1}$, catalyst to oil of 15 to 25, Pressure of 1 to 4 kg/cm$^2$ and temperature of 530 to 600° C. The LPG yield obtained is 40-65 wt %, propylene make is 40-50 wt % in LPG and ethylene is 50 wt % in Dry Gas. However, the major drawback of the process is the low coke production in hydrotreated VGO feed. Thus, additional coke is needed to meet the heat requirements of riser. The process is riser cracking based and suitable mainly for heavy residual petroleum feedstock and it is difficult to operate at lower pressure with hydrotreated VGO feed, which is desirable for light olefin selectivity. The patent is silent on cracking C4s, which is essential for increasing propylene yield. The patent discloses the usage of single reactor, whereby bottoms yield is difficult to be reduced to the minimum level.

U.S. Pat. No. 6,656,346 describes a process to crack heavy oil fraction by contacting oil with a catalyst mixture of 60 to 95 wt % base USY zeolite catalyst and 5 to 40 wt % shape selective zeolite in the range of 580 to 630° C., catalyst to oil of 15 to 40 wt/wt and contact time of 0.1 to 1 secs. However, the unit configuration is totally different from conventional riser cracking and comprises of combustor type regenerator for catalyst regeneration and downflow riser for catalytic cracking. The high severity operation with high catalyst to oil ratio for paraffinic gas oil feed (which is more selective towards light olefins) needs additional source of heat to meet heat balance. Also there is huge requirement of catalyst due to high cat-oil ratios.

U.S. Pat. Nos. 7,611,622, 5,702,589, US 2014/0014555A1 and U.S. Pat. No. 6,093,867 discloses different methods for recycling/injecting of naphtha and C4 streams in a separate riser or in riser bottom as well as stripping zones to increase light olefin yields.

SUMMARY

The present disclosure relates to a catalyst composition comprising: 70-98% of a non-zeolitic material; and 2-30% of at least one zeolite material, the percentage being based on weight of the catalyst composition.

The present disclosure also relates to a method of preparing the catalyst composition, the method comprising the steps of: (a) mixing 70-98 wt % of a non-zeolitic material, and 2-30 wt % of at least one zeolite material to obtain a slurry; (b) spray drying the slurry to micro-spheres; and (b) calcining the micro-spheres at 500-600° C. for 1-2 hours to obtain the catalyst composition.

The present disclosure further relates to a process for the fluid catalytic cracking of a hydrocarbon feedstock, which comprises: (a) contacting the hydrocarbon feedstock with a catalyst composition in a fluid catalytic cracking (FCC) apparatus, in the presence of steam at a temperature in the range of from 550 to 600° C., pressure in the range of from 0.5 to 2.0 kg/cm$^2$, catalyst composition-to-hydrocarbon feedstock in the range of 10 to 20% by weight, riser residence time of 2 to 5 sec, and steam-to-hydrocarbon feedstock ratio of 5 to 40% by weight, thereby cracking the hydrocarbon feedstock in the first reactor (1) to obtain a crackable recycle stream; and (b) cracking the crackable recycle stream in the second reactor (2) with WHSV of 0-40 hr$^{-1}$ to obtain light olefins; wherein the light olefins are selected from ethylene, propylene, and butylenes.

The present disclosure relates to an apparatus for enhanced light olefins production in a fluid catalytic cracking unit using the catalyst composition comprising: 70-98% of a non-zeolitic material; and 2-30% of at least one zeolite material, the percentage being based on weight of the catalyst composition.

These and other features, aspects and advantages of the present subject matter will be better understood with reference to the following description and appended claims. This summary is provided to introduce a selection of concepts in a simplified form. This summary is not intended to identify key features or essential features of the claimed subject matter, nor is it intended to be used to limit the scope of the claimed subject matter.

BRIEF DESCRIPTION OF DRAWINGS

The detailed description is described with reference to the accompanying figures. In the figures, the left-most digit(s) of a reference number identifies the FIGURE in which the reference number first appears. The same numbers are used throughout the drawings to reference like features and components.

FIG. 1 is a schematic illustration of an example of a fluid catalytic cracking (FCC) apparatus.

DETAILED DESCRIPTION

Those skilled in the art will be aware that the present disclosure is subject to variations and modifications other than those specifically described. It is to be understood that the present disclosure includes all such variations and modifications. The disclosure also includes all such steps, features, compositions and compounds referred to or indicated in this specification, individually or collectively and any and all combinations of any or more of such steps or features.

Definitions

For convenience, before further description of the present disclosure, certain terms employed in the specification, and examples are collected here. These definitions should be read in the light of the remainder of the disclosure and understood as by a person of skill in the art. The terms used herein have the meanings recognized and known to those of skill in the art, however, for convenience and completeness, particular terms and their meanings are set forth below.

The articles "a", "an" and "the" are used to refer to one or to more than one (i.e., to at least one) of the grammatical object of the article.

The terms "comprise" and "comprising" are used in the inclusive, open sense, meaning that additional elements may be included. Throughout this specification, unless the context requires otherwise the word "comprise", and variations, such as "comprises" and "comprising", will be understood to imply the inclusion of a stated element or step or group of element or steps but not the exclusion of any other element or step or group of element or steps.

The term "including" is used to mean "including but not limited to". "Including" and "including but not limited to" are used interchangeably.

The term "riser reactor" and "first reactor (1)" are used interchangeably.

The term "dense bed riser reactor" and "second reactor (2)" are used interchangeably.

The term "hydrocarbon feedstock" refers to heavy oils left-over from petroleum distillation that can be further refined in a catalytic cracking unit. Examples of hydrocarbon feedstock are hydrotreated vacuum gas oil (VGO), coker gasoline, coker fuel oil (CFO), hydro cracker bottom, vacuum gas oil (VGO), vacuum residue, residue coker oil (RCO), heavy vacuum gas oil (HVGO).

"Light naphtha" is the fraction having boiling between 30° C. and 90° C. and consists of molecules with 5-6 carbon atoms.

The term "C4 stream" refers to butanes & butenes.

Butylenes are selected from the group consisting of 1-butene, 2-butene and iso-butylene.

Alkaline earth metals used in the present application are selected from the group consisting of Sr, Ba, Ca, and Mg.

Transition elements used in the present application are selected from the group consisting of Fe, Zn, and Mn.

The term "Clarified oil (CLO) stream" refers to a heavy aromatic by-product of a refinery's fluid catalytic cracking unit that forms a small part of global fuel oil supply.

The term "Zeolite modified with phosphorus, alkaline earth metals and transition elements" refers to loading of these elements on ZSM-5 to improve the selectivity & yield of propylene Ratios, concentrations, amounts, and other numerical data may be presented herein in a range format. It is to be understood that such range format is used merely for convenience and brevity and should be interpreted flexibly to include not only the numerical values explicitly recited as the limits of the range, but also to include all the individual numerical values or sub-ranges encompassed within that range as if each numerical value and sub-range is explicitly recited. For example, a temperature range of about 100° C. to about 180° C. should be interpreted to include not only the explicitly recited limits of about 100° C. to about 180° C., but also to include sub-ranges, such as 125° C. to 145° C., 130° C. to 150° C., and so forth, as well as individual amounts, including fractional amounts, within the specified ranges, such as 122.2° C., 140.6° C., and 141.3° C., for example.

Unless defined otherwise, all technical and scientific terms used herein have the same meaning as commonly understood by one of ordinary skill in the art to which this disclosure belongs. Although any methods and materials similar or equivalent to those described herein can be used in the practice or testing of the disclosure, the preferred methods, and materials are now described. All publications mentioned herein are incorporated herein by reference.

The present disclosure is not to be limited in scope by the specific embodiments described herein, which are intended for the purposes of exemplification only. Functionally-equivalent products, compositions, and methods are clearly within the scope of the disclosure, as described herein.

The present disclosure relates to a fluid catalytic cracking (FCC) process for maximization of light olefins.

The present disclosure relates to a catalyst composition having different zeolite types either formed separately or blended in the same catalyst particle. The zeolites of different types are added in different percentages for enhancing selectivity towards light olefins, such as propylene.

In an embodiment of the present disclosure, there is provided a catalyst composition comprising: 70-98% of a non-zeolitic material; and 2-30% of at least one zeolite material, the percentage being based on weight of the catalyst composition.

In another embodiment of the present disclosure, there is provided a catalyst composition comprising: 70-95% of a non-zeolitic material; and 2-18% of at least one zeolite material, the percentage being based on weight of the catalyst composition.

In an embodiment of the present disclosure, there is provided a catalyst composition as described herein, wherein the non-zeolitic material is a combination of active and inactive material having ratio of 0.4-0.5. The active material can be alumina based that provides the primary cracking sites for cracking of larger molecules. The inactive material can include a binder and filler. The binder is selected from a group comprising of silica, silica-alumina and phosphate. The filler is selected from a group comprising of kaolin clay, montmorillonite clay, bentonites clay, laolinite clay, halloysite clay, and combinations thereof.

In an embodiment of the present disclosure, there is provided a catalyst composition as described herein, wherein the at least one zeolite material is selected from zeolite-1, zeolite-2, and combinations thereof.

In an embodiment of the present disclosure, there is provided a catalyst composition comprising: a non-zeolitic material; and zeolite-1.

In an embodiment of the present disclosure, there is provided a catalyst composition comprising: a non-zeolitic material; and zeolite-2.

In an embodiment of the present disclosure, there is provided a catalyst composition comprising: a non-zeolitic material; zeolite-1; and zeolite-2.

In an embodiment of the present disclosure, there is provided a catalyst composition comprising: 82-97 wt % of a non-zeolitic material; and 3-18 wt % of zeolite-1.

In an embodiment of the present disclosure, there is provided a catalyst composition comprising: 70-98 wt % of a non-zeolitic material; and 2-12 wt % of zeolite-2.

In an embodiment of the present disclosure, there is provided a catalyst composition comprising: 70-95 wt % of a non-zeolitic material; 3-18 wt % of zeolite-1; and 2-12 wt % of zeolite-2.

In an embodiment of the present disclosure, there is provided a catalyst composition comprising: 70-98% of a non-zeolitic material having a combination of active and inactive material; and 2-30% of at least one zeolite material, the percentage being based on weight of the catalyst composition.

In an embodiment of the present disclosure, there is provided a catalyst composition comprising: 70-95% of a non-zeolitic material having a combination of active and inactive material; and 2-18% of at least one zeolite material, the percentage being based on weight of the catalyst composition.

In an embodiment of the present disclosure, there is provided a catalyst composition comprising: 70-98% of a non-zeolitic material; and 2-30% of at least one zeolite material is selected from zeolite-1, zeolite-2, and combinations thereof, the percentage being based on weight of the catalyst composition.

In an embodiment of the present disclosure, there is provided a catalyst composition comprising: 70-95% of a non-zeolitic material; and 2-18% of at least one zeolite material is selected from zeolite-1, zeolite-2, and combinations thereof, the percentage being based on weight of the catalyst composition.

In an embodiment of the present disclosure, there is provided a catalyst composition comprising: 70-95 wt % of a non-zeolitic material; 3-18 wt % of zeolite-1 having a pore size in the range of 7-8° A, and 2-12% of zeolite-2.

In an embodiment of the present disclosure, there is provided a catalyst composition comprising: 70-95 wt % of a non-zeolitic material; 3-18 wt % of zeolite-1 selected from a group consisting of ultra-stable Y (USY), Rare Earth exchanged USY (REUSY), Beta, and combinations thereof, and 2-12 wt % of zeolite-2.

In an embodiment of the present disclosure, there is provided a catalyst composition comprising: 70-95 wt % of a non-zeolitic material; 3-18 wt % of zeolite-1 having a pore size in the range of 7-8° A and selected from a group consisting of ultra-stable Y (USY), rare earth exchanged USY (REUSY), Beta, and combinations thereof, and 2-12 wt % of zeolite-2.

In an embodiment of the present disclosure, there is provided a catalyst composition comprising: 76-86 wt % of a non-zeolitic material; 3-14 wt % of zeolite-1 having a pore size in the range of 7-8° A and selected from a group consisting of ultra-stable Y (USY), rare earth exchanged USY (REUSY), Beta, and combinations thereof, and 2-10 wt % of zeolite-2.

In an embodiment of the present disclosure, there is provided a catalyst composition comprising: 70-95 wt % of a non-zeolitic material; 3-18 wt % of zeolite-1; and 2-12 wt % of zeolite-2 having a pore size in the range of 5-6° A.

In an embodiment of the present disclosure, there is provided a catalyst composition comprising: 70-95 wt % of a non-zeolitic material; 3-18 wt % of zeolite-1; and 2-12 wt % of zeolite-2 is selected from a group consisting of ZSM-5, ZSM-11, ZSM-22, SAPO-11, and combinations thereof and is modified with phosphorous, alkaline earth, transition elements. The zeolite is modified to create mesoporosity. The modified zeolite-2 provides high accessibility & reduces hydrogen transfer reactions by easy transport of hydrocarbon molecules.

In an embodiment of the present disclosure, there is provided a catalyst composition comprising: 70-95 wt % of a non-zeolitic material; 3-18 wt % of zeolite-1; and 2-12 wt % of zeolite-2 is selected from a group consisting of ZSM-5, ZSM-11, ZSM-22, SAPO-11, and combinations thereof and is modified with phosphorous, alkaline earth, Fe, Zn or Mn.

In an embodiment of the present disclosure, there is provided a catalyst composition comprising: 70-95 wt % of a non-zeolitic material; 3-18 wt % of zeolite-1; and 2-12 wt % of zeolite-2 having a pore size in the range of 5-6° A and selected from a group consisting of ZSM-5, ZSM-11, ZSM-22, SAPO-11, and combinations thereof and is modified with phosphorous, alkaline earth, transition elements.

In an embodiment of the present disclosure, there is provided a catalyst composition comprising: 70-95 wt % of a non-zeolitic material; 3-18 wt % of zeolite-1; and 2-12 wt % of zeolite-2 having a pore size in the range of 5-6° A and selected from a group consisting of ZSM-5, ZSM-11, ZSM-22, SAPO-11, and combinations thereof and is modified with phosphorous, alkaline earth, Fe, ZN or Mn.

In an embodiment of the present disclosure, there is provided a catalyst composition comprising: 76-86 wt % of a non-zeolitic material; 3-14 wt % of zeolite-1, and 2-10 wt % of zeolite-2 having a pore size in the range of 5-6° A and selected from a group consisting of ZSM-5, ZSM-11, ZSM-22, SAPO-11, and combinations thereof and is modified with phosphorous, alkaline earth, transition elements.

In an embodiment of the present disclosure, there is provided a catalyst composition comprising: 76-86 wt % of a non-zeolitic material; 3-14 wt % of zeolite-1, and 2-10 wt % of zeolite-2 having a pore size in the range of 5-6° A and selected from a group consisting of ZSM-5, ZSM-11, ZSM- 22, SAPO-11, and combinations thereof and is modified with phosphorous, alkaline earth, Fe, Zn or Mn.

In an embodiment of the present disclosure, there is provided a catalyst composition comprising: 70-95 wt % of a non-zeolitic material having a combination of active and inactive material; 3-18 wt % of zeolite-1 having a pore size in the range of 7-8° A, and 2-12 wt % of zeolite-2 having a pore size in the range of 5-6° A.

In an embodiment of the present disclosure, there is provided a catalyst composition comprising: 70-95 wt % of a non-zeolitic material having a combination of active and inactive material; 3-18 wt % of zeolite-1 selected from a group consisting of ultra-stable Y (USY), rare earth exchanged USY (REUSY), Beta, and combinations thereof, and 2-12 wt % of zeolite-2 selected from a group consisting of ZSM-5, ZSM-11, ZSM-22, SAPO-11, and combinations thereof and is modified with phosphorous, alkaline earth, transition elements.

In an embodiment of the present disclosure, there is provided a catalyst composition comprising: 70-95 wt % of a non-zeolitic material having a combination of active and inactive material; 3-18 wt % of zeolite-1 having a pore size in the range of 7-8° A and selected from a group consisting of Ultra-Stable Y (USY), Rare Earth exchanged USY (REUSY), Beta, and combinations thereof, and 2-12 wt % of zeolite-2 having a pore size in the range of 5-6° A and selected from a group consisting of ZSM-5, ZSM-11, ZSM-22, SAPO-11, and combinations thereof and is modified with phosphorous, alkaline earth, transition elements.

In an embodiment of the present disclosure, there is provided a catalyst composition comprising: 70-95 wt % of a non-zeolitic material having a combination of active and inactive material; 3-18 wt % of zeolite-1 having a pore size in the range of 7-8° A and selected from a group consisting of Ultra-Stable Y (USY), Rare Earth exchanged USY (REUSY), Beta, and combinations thereof, and 2-12 wt % of zeolite-2 having a pore size in the range of 5-6° A and selected from a group consisting of ZSM-5, ZSM-11, ZSM-22, SAPO-11, and combinations thereof and is modified with phosphorous, alkaline earth, Fe, Zn or Mn.

In an embodiment of the present disclosure, there is provided a catalyst composition comprising: 76-86 wt % of a non-zeolitic material having a combination of active and inactive material; 3-14 wt % of zeolite-1 having a pore size in the range of 7-8° A, and 2-10 wt % of zeolite-2 having a pore size in the range of 5-6° A.

In an embodiment of the present disclosure, there is provided a catalyst composition comprising: 76-86 wt % of a non-zeolitic material having a combination of active and inactive material; 3-14 wt % of zeolite-1 selected from a group consisting of Ultra-Stable Y (USY), Rare Earth exchanged USY (REUSY), Beta, and combinations thereof, and 2-10 wt % of zeolite-2 selected from a group consisting of ZSM-5, ZSM-11, ZSM-22, SAPO-11, and combinations thereof and is modified with phosphorous, alkaline earth, transition elements.

In an embodiment of the present disclosure, there is provided a catalyst composition comprising: 76-86 wt % of a non-zeolitic material having a combination of active and inactive material; 3-14 wt % of zeolite-1 selected from a group consisting of Ultra-Stable Y (USY), Rare Earth exchanged USY (REUSY), Beta, and combinations thereof, and 2-10 wt % of zeolite-2 selected from a group consisting of ZSM-5, ZSM-11, ZSM-22, SAPO-11, and combinations thereof and is modified with phosphorous, alkaline earth, Fe, Zn or Mn.

In an embodiment of the present disclosure, there is provided a catalyst composition comprising: 76-86 wt % of a non-zeolitic material having a combination of active and inactive material; 3-14 wt % of zeolite-1 having a pore size in the range of 7-8° A and selected from a group consisting of Ultra-Stable Y (USY), Rare Earth exchanged USY (REUSY), Beta, and combinations thereof, and 2-10 wt % of zeolite-2 having a pore size in the range of 5-6° A and selected from a group consisting of ZSM-5, ZSM-11, ZSM-22, SAPO-11, and combinations thereof and is modified with phosphorous, alkaline earth, transition elements.

In an embodiment of the present disclosure, there is provided a catalyst composition comprising: 76-86 wt % of a non-zeolitic material having a combination of active and inactive material; 3-14 wt % of zeolite-1 having a pore size in the range of 7-8° A and is selected from a group consisting of Ultra-Stable Y (USY), Rare Earth exchanged USY (REUSY), Beta, and combinations thereof, and 2-10 wt % of zeolite-2 having a pore size in the range of 5-6° A and is selected from a group consisting of ZSM-5, ZSM-11, ZSM-22, SAPO-11, and combinations thereof and is modified with phosphorous, alkaline earth, Fe, Zn or Mn.

In an embodiment of the present disclosure, there is provided a catalyst composition comprising: a non-zeolitic material; at least one zeolite material, wherein the at least one zeolite material is selected from zeolite-1, zeolite-2, and combinations thereof, wherein the zeolite-2 has a Si/Al ratio in the range of 25 to 100.

In an embodiment of the present disclosure, there is provided a catalyst composition comprising: a non-zeolitic material; at least one zeolite material, wherein the at least one zeolite material is selected from zeolite-1, zeolite-2, and combinations thereof, wherein the zeolite-2 has a Si/Al ratio in the range of 30 to 80.

In an embodiment of the present disclosure, there is provided a catalyst composition comprising: 70-95 wt % of a non-zeolitic material; 3-18 wt % of zeolite-1; and 2-12 wt % of zeolite-2, wherein the zeolite-2 has a Si/Al ratio in the range of 25 to 100.

In an embodiment of the present disclosure, there is provided a catalyst composition comprising: 70-95 wt % of a non-zeolitic material; 3-18 wt % of zeolite-1; and 2-12 wt % of zeolite-2, wherein the zeolite-2 has a Si/Al ratio in the range of 30 to 80.

In an embodiment of the present disclosure, there is provided a catalyst composition comprising: 76-86 wt % of a non-zeolitic material; 3-14 wt % of zeolite-1; and 2-10 wt % of zeolite-2, wherein the zeolite-2 has a Si/Al ratio in the range of 25 to 100.

In an embodiment of the present disclosure, there is provided a catalyst composition comprising: 76-86 wt % of a non-zeolitic material; 3-14 wt % of zeolite-1; and 2-10 wt % of zeolite-2, wherein the zeolite-2 has a Si/Al ratio in the range of 30 to 80.

The present disclosure also relates to a method of preparing the catalyst composition, the method comprising the steps of: (a) mixing 70-98 wt % of a non-zeolitic material, and 2-30 wt % of at least one zeolite material to obtain a slurry; (b) spray drying the slurry to micro-spheres; and (b) calcining the micro-spheres at 500-600° C. for 1-2 hours to obtain the catalyst composition.

The present disclosure also relates to a method of preparing the catalyst composition, the method comprising the steps of: (a) mixing 70-98 wt % of a non-zeolitic material having a combination of active and inactive material, and 2-30 wt % of at least one zeolite material to obtain a slurry; (b) spray drying the slurry to micro-spheres; and (b) calcining the micro-spheres at 500-600° C. for 1-2 hours to obtain the catalyst composition. The active material is alumina based. The inactive material is comprised of a binder and filler.

The present disclosure also relates to a method of preparing the catalyst composition, the method comprising the steps of: (a) mixing 70-98 wt % of a non-zeolitic material, and 2-30 wt % of at least one zeolite material, wherein the at least one zeolite material is selected from zeolite-1, zeolite-2, and combinations thereof to obtain a slurry; (b) spray drying the slurry to micro-spheres; and (b) calcining the micro-spheres at 500-600° C. for 1-2 hours to obtain the catalyst composition.

The present disclosure also relates to a method of preparing the catalyst composition, the method comprising the steps of: (a) mixing 70-95 wt % of a non-zeolitic material, 3-18 wt % of zeolite-1, and 2-12 wt % of zeolite-2 to obtain a slurry; (b) spray drying the slurry to micro-spheres; and (b) calcining the micro-spheres at 500-600° C. for 1-2 hours to obtain the catalyst composition.

The present disclosure also relates to a method of preparing the catalyst composition, the method comprising the steps of: (a) mixing 70-98 wt % of a non-zeolitic material having a combination of active and inactive material, and 2-30 wt % of at least one zeolite material, wherein the at least one zeolite material is selected from zeolite-1, zeolite-2, and combinations thereof, to obtain a slurry; (b) spray drying the slurry to micro-spheres; and (b) calcining the micro-spheres at 500-600° C. for 1-2 hours to obtain the catalyst composition.

The present disclosure also relates to a method of preparing the catalyst composition, the method comprising the steps of: (a) mixing 70-95 wt % of a non-zeolitic material having a combination of active and inactive material, 3-18 wt % of zeolite-1, and 2-12 wt % of zeolite-2 to obtain a slurry; (b) spray drying the slurry to micro-spheres; and (b) calcining the micro-spheres at 500-600° C. for 1-2 hours to obtain the catalyst composition.

The present disclosure also relates to a method of preparing the catalyst composition, the method comprising the steps of: (a) mixing 70-95 wt % of a non-zeolitic material, 3-18 wt % of zeolite-1 having a pore size in the range of 7-8° A and selected from a group consisting of Ultra-Stable Y (USY), Rare Earth exchanged USY (REUSY), Beta, and 2-12 wt % of zeolite-2 to obtain a slurry; (b) spray drying the slurry to micro-spheres; and (b) calcining the micro-spheres at 500-600° C. for 1-2 hours to obtain the catalyst composition.

The present disclosure also relates to a method of preparing the catalyst composition, the method comprising the steps of: (a) mixing 70-95 wt % of a non-zeolitic material, 3-18 wt % of zeolite-1, and 2-12 wt % of zeolite-2 having a pore size in the range of 5-6° A and selected from a group consisting of ZSM-5, ZSM-11, ZSM-22, SAPO-11, and combinations thereof and is modified with phosphorous, alkaline earth, transition elements to obtain a slurry; (b) spray drying the slurry to micro-spheres; and (b) calcining the micro-spheres at 500-600° C. for 1-2 hours to obtain the catalyst composition.

The present disclosure also relates to a method of preparing the catalyst composition, the method comprising the steps of: (a) mixing 70-95 wt % of a non-zeolitic material, 3-18 wt % of zeolite-1, and 2-12 wt % of zeolite-2 having a pore size in the range of 5-6° A and selected from a group consisting of ZSM-5, ZSM-11, ZSM-22, SAPO-11, and combinations thereof and is modified with phosphorous, alkaline earth, Fe, Zn or Mn to obtain a slurry; (b) spray drying the slurry to micro-spheres; and (b) calcining the micro-spheres at 500-600° C. for 1-2 hours to obtain the catalyst composition.

The present disclosure also relates to a method of preparing the catalyst composition, the method comprising the steps of: (a) mixing 70-95 wt % of a non-zeolitic material having a combination of active and inactive material, 3-18 wt % of zeolite-1 having a pore size in the range of 7-8° A and selected from a group consisting of ultra-stable Y (USY), rare earth exchanged USY (REUSY), Beta, and 2-12 wt % of zeolite-2 having a pore size in the range of 5-6° A and selected from a group consisting of ZSM-5, ZSM-11, ZSM-22, SAPO-11, and combinations thereof and is modified with phosphorous, alkaline earth, transition elements to obtain a slurry; (b) spray drying the slurry to micro-spheres; and (b) calcining the micro-spheres at 500-600° C. for 1-2 hours to obtain the catalyst composition.

The present disclosure also relates to a method of preparing the catalyst composition, the method comprising the steps of: (a) mixing 70-95 wt % of a non-zeolitic material having a combination of active and inactive material, 3-18 wt % of zeolite-1 having a pore size in the range of 7-8° A and selected from a group consisting of Ultra-Stable Y (USY), Rare Earth exchanged USY (REUSY), Beta, and 2-12 wt % of zeolite-2 having a pore size in the range of 5-6° A and selected from a group consisting of ZSM-5, ZSM-11, ZSM-22, SAPO-11, and combinations thereof and is modified with phosphorous, alkaline earth, Fe, Zn or Mn to obtain a slurry; (b) spray drying the slurry to micro-spheres; and (b) calcining the micro-spheres at 500-600° C. for 1-2 hours to obtain the catalyst composition.

The present disclosure also relates to a method of preparing the catalyst composition, the method comprising the steps of: (a) mixing 76-86 wt % of a non-zeolitic material having a combination of active and inactive material, 3-14 wt % of zeolite-1 having a pore size in the range of 7-8° A and selected from a group consisting of Ultra-Stable Y (USY), Rare Earth exchanged USY (REUSY), Beta, and 2-10 wt % of zeolite-2 having a pore size in the range of 5-6° A and selected from a group consisting of ZSM-5, ZSM-11, ZSM-22, SAPO-11, and combinations thereof and is modified with phosphorous, alkaline earth, transition elements to obtain a slurry; (b) spray drying the slurry to micro-spheres; and (b) calcining the micro-spheres at 500-600° C. for 1-2 hours to obtain the catalyst composition.

The present disclosure also relates to a method of preparing the catalyst composition, the method comprising the steps of: (a) mixing 76-86 wt % of a non-zeolitic material having a combination of active and inactive material, 3-14 wt % of zeolite-1 having a pore size in the range of 7-8° A and selected from a group consisting of Ultra-Stable Y (USY), Rare Earth exchanged USY (REUSY), Beta, and 2-10 wt % of zeolite-2 having a pore size in the range of 5-6° A and selected from a group consisting of ZSM-5, ZSM-11, ZSM-22, SAPO-11, and combinations thereof and is modified with phosphorous, alkaline earth, Fe, Zn or Mn to obtain a slurry; (b) spray drying the slurry to micro-spheres; and (b) calcining the micro-spheres at 500-600° C. for 1-2 hours to obtain the catalyst composition.

The present disclosure discloses a process for the fluid catalytic cracking of a hydrocarbon feedstock, which comprises: (a) contacting the hydrocarbon feedstock with a catalyst composition comprising: a non-zeolitic material; at least one zeolite material, in a fluid catalytic cracking (FCC) apparatus, in the presence of steam at a temperature in the range of from 550 to 600° C., pressure in the range of from 0.5 to 2.0 kg/cm², catalyst composition-to-hydrocarbon feedstock ratio of 10 to 20% by weight, riser residence time of 2 to 5 sec, and steam-to-hydrocarbon feedstock ratio of 5 to 40% by weight, thereby cracking the hydrocarbon feedstock in the first reactor (1) to obtain a crackable recycle stream; and (b) cracking the crackable recycle stream in the second reactor (2) with WHSV of 0-40 hr$^{-1}$ to obtain light olefins.

The present disclosure further relates to a process for the fluid catalytic cracking of a hydrocarbon feedstock, which comprises: (a) contacting the hydrocarbon feedstock with a catalyst composition in a fluid catalytic cracking (FCC) apparatus, in the presence of steam at a temperature in the range of from 550 to 580° C., pressure in the range of from 0.5 to 1.5 kg/cm$^2$, catalyst composition-to-hydrocarbon feedstock in the range of 10 to 15% by weight, riser residence time of 2 to 5 sec, and steam-to-hydrocarbon feedstock ratio of 15 to 30% by weight, thereby cracking the hydrocarbon feedstock in the first reactor (1) to obtain a crackable recycle stream; and (b) cracking the crackable recycle stream in the second reactor (2) with WHSV of 0-40 hr$^{-1}$ to obtain light olefins; wherein the light olefins are selected from ethylene, propylene, and butylenes.

The present disclosure discloses a process for the fluid catalytic cracking of a hydrocarbon feedstock, which comprises: (a) contacting the hydrocarbon feedstock with a catalyst composition comprising: 70-98% of a non-zeolitic material; and 2-30% of at least one zeolite material, the percentage being based on weight of the catalyst composition, in a fluid catalytic cracking (FCC) apparatus, in the presence of steam at a temperature in the range of from 550 to 600° C., pressure in the range of from 0.5 to 2.0 kg/cm$^2$, catalyst composition-to-hydrocarbon feedstock ratio of 10 to 20% by weight, riser residence time of 2 to 5 sec, and steam-to-hydrocarbon feedstock ratio of 5 to 40% by weight, thereby cracking the hydrocarbon feedstock in the first reactor (1) to obtain a crackable recycle stream; and (b) cracking the crackable recycle stream in the second reactor (2) with WHSV of 0-40 hr$^{-1}$ to obtain light olefins.

The present disclosure discloses a process for the fluid catalytic cracking of a hydrocarbon feedstock, which comprises: (a) contacting the hydrocarbon feedstock with a catalyst composition comprising: 70-98% of a non-zeolitic material, wherein the non-zeolitic material is a combination of active and inactive material; and 2-30% of at least one zeolite material, the percentage being based on weight of the catalyst composition, in a fluid catalytic cracking (FCC) apparatus, in the presence of steam at a temperature in the range of from 550 to 600° C., pressure in the range of from 0.5 to 2.0 kg/cm$^2$, catalyst composition-to-hydrocarbon feedstock ratio of 10 to 20% by weight, riser residence time of 2 to 5 sec, and steam-to-hydrocarbon feedstock ratio of 5 to 40% by weight, thereby cracking the hydrocarbon feedstock in the first reactor (1) to obtain a crackable recycle stream; and (b) cracking the crackable recycle stream in the second reactor (2) with WHSV of 0-40 hr$^{-1}$ to obtain light olefins.

The present disclosure discloses a process for the fluid catalytic cracking of a hydrocarbon feedstock, which comprises: (a) contacting the hydrocarbon feedstock with a catalyst composition comprising: a non-zeolitic material; and at least one zeolite material selected from zeolite-1, zeolite-2, and combinations thereof, the percentage being based on weight of the catalyst composition, in a fluid catalytic cracking (FCC) apparatus, in the presence of steam at a temperature in the range of from 550 to 600° C., pressure in the range of from 0.5 to 2.0 kg/cm$^2$, catalyst composition-to-hydrocarbon feedstock ratio of 10 to 20% by weight, riser residence time of 2 to 5 sec, and steam-to-hydrocarbon feedstock ratio of 5 to 40% by weight, thereby cracking the hydrocarbon feedstock in the first reactor (1) to obtain a crackable recycle stream; and (b) cracking the crackable recycle stream in the second reactor (2) with WHSV of 0-40 hr$^{-1}$ to obtain light olefins.

The present disclosure discloses a process for the fluid catalytic cracking of a hydrocarbon feedstock, which comprises: (a) contacting the hydrocarbon feedstock with a catalyst composition comprising: 70-98% of a non-zeolitic material; and 2-30% of at least one zeolite material selected from zeolite-1, zeolite-2, and combinations thereof, the percentage being based on weight of the catalyst composition, in a fluid catalytic cracking (FCC) apparatus, in the presence of steam at a temperature in the range of from 550 to 600° C., pressure in the range of from 0.5 to 2.0 kg/cm$^2$, catalyst composition-to-hydrocarbon feedstock ratio of 10 to 20% by weight, riser residence time of 2 to 5 sec, and steam-to-hydrocarbon feedstock ratio of 5 to 40% by weight, thereby cracking the hydrocarbon feedstock in the first reactor (1) to obtain a crackable recycle stream; and (b) cracking the crackable recycle stream in the second reactor (2) with WHSV of 0-40 hr$^{-1}$ to obtain light olefins.

The present disclosure discloses a process for the fluid catalytic cracking of a hydrocarbon feedstock, which comprises: (a) contacting the hydrocarbon feedstock with a catalyst composition comprising: 70-95% of a non-zeolitic material; 3-18% of zeolite-1, and 2-12 wt % of zeolite-2, in a fluid catalytic cracking (FCC) apparatus, in the presence of steam at a temperature in the range of from 550 to 600° C., pressure in the range of from 0.5 to 2.0 kg/cm$^2$, catalyst composition-to-hydrocarbon feedstock ratio of 10 to 20% by weight, riser residence time of 2 to 5 sec, and steam-to-hydrocarbon feedstock ratio of 5 to 40% by weight, thereby cracking the hydrocarbon feedstock in the first reactor (1) to obtain a crackable recycle stream; and (b) cracking the crackable recycle stream in the second reactor (2) with WHSV of 0-40 hr$^{-1}$ to obtain light olefins.

The present disclosure discloses a process for the fluid catalytic cracking of a hydrocarbon feedstock, which comprises: (a) contacting the hydrocarbon feedstock with a catalyst composition comprising: 70-95% of a non-zeolitic material having a combination of active and inactive material; 3-18% of zeolite-1, and 2-12 wt % of zeolite-2, in a fluid catalytic cracking (FCC) apparatus, in the presence of steam at a temperature in the range of from 550 to 600° C., pressure in the range of from 0.5 to 2.0 kg/cm$^2$, catalyst composition-to-hydrocarbon feedstock ratio of 10 to 20% by weight, riser residence time of 2 to 5 sec, and steam-to-hydrocarbon feedstock ratio of 5 to 40% by weight, thereby cracking the hydrocarbon feedstock in the first reactor (1) to obtain a crackable recycle stream; and (b) cracking the crackable recycle stream in the second reactor (2) with WHSV of 0-40 hr$^{-1}$ to obtain light olefins.

The present disclosure discloses a process for the fluid catalytic cracking of a hydrocarbon feedstock, which comprises: (a) contacting the hydrocarbon feedstock with a catalyst composition comprising: 70-95% of a non-zeolitic material; 3-18% of zeolite-1 having a pore size in the range of 7-8° A, and 2-12 wt % of zeolite-2, in a Fluid Catalytic Cracking (FCC) apparatus, in the presence of steam at a temperature in the range of from 550 to 600° C., pressure in the range of from 0.5 to 2.0 kg/cm$^2$, catalyst composition-to-hydrocarbon feedstock ratio of 10 to 20% by weight, riser residence time of 2 to 5 sec, and steam-to-hydrocarbon feedstock ratio of 5 to 40% by weight, thereby cracking the hydrocarbon feedstock in the first reactor (1) to obtain a crackable recycle stream; and (b) cracking the crackable recycle stream in the second reactor (2) with WHSV of 0-40 hr$^{-1}$ to obtain light olefins.

The present disclosure discloses a process for the fluid catalytic cracking of a hydrocarbon feedstock, which comprises: (a) contacting the hydrocarbon feedstock with a catalyst composition comprising: 70-95% of a non-zeolitic material; 3-18% of zeolite-1 selected from a group consisting of Ultra-Stable Y (USY), Rare Earth exchanged USY (REUSY), Beta, and combinations thereof, and 2-12 wt % of zeolite-2, in a Fluid Catalytic Cracking (FCC) apparatus, in the presence of steam at a temperature in the range of from 550 to 600° C., pressure in the range of from 0.5 to 2.0 kg/cm$^2$, catalyst composition-to-hydrocarbon feedstock ratio of 10 to 20% by weight, riser residence time of 2 to 5 sec, and steam-to-hydrocarbon feedstock ratio of 5 to 40% by weight, thereby cracking the hydrocarbon feedstock in the first reactor (1) to obtain a crackable recycle stream; and (b) cracking the crackable recycle stream in the second reactor (2) with WHSV of 0-40 hr$^{-1}$ to obtain light olefins.

The present disclosure discloses a process for the fluid catalytic cracking of a hydrocarbon feedstock, which comprises: (a) contacting the hydrocarbon feedstock with a catalyst composition comprising: 70-95% of a non-zeolitic material; 3-18% of zeolite-1 having a pore size in the range of 7-8° A and selected from a group consisting of Ultra-Stable Y (USY), Rare Earth exchanged USY (REUSY), Beta, and combinations thereof, and 2-12 wt % of zeolite-2, in a Fluid Catalytic Cracking (FCC) apparatus, in the presence of steam at a temperature in the range of from 550 to 600° C., pressure in the range of from 0.5 to 2.0 kg/cm$^2$, catalyst composition-to-hydrocarbon feedstock ratio of 10 to 20% by weight, riser residence time of 2 to 5 sec, and steam-to-hydrocarbon feedstock ratio of 5 to 40% by weight, thereby cracking the hydrocarbon feedstock in the first reactor (1) to obtain a crackable recycle stream; and (b) cracking the crackable recycle stream in the second reactor (2) with WHSV of 0-40 hr$^{-1}$ to obtain light olefins.

The present disclosure discloses a process for the fluid catalytic cracking of a hydrocarbon feedstock, which comprises: (a) contacting the hydrocarbon feedstock with a catalyst composition comprising: 70-95% of a non-zeolitic material; 3-18% of zeolite-1, and 2-12 wt % of zeolite-2 having a pore size in the range of 5-6° A, in a Fluid Catalytic Cracking (FCC) apparatus, in the presence of steam at a temperature in the range of from 550 to 600° C., pressure in the range of from 0.5 to 2.0 kg/cm$^2$, catalyst composition-to-hydrocarbon feedstock ratio of 10 to 20% by weight, riser residence time of 2 to 5 sec, and steam-to-hydrocarbon feedstock ratio of 5 to 40% by weight, thereby cracking the hydrocarbon feedstock in the first reactor (1) to obtain a crackable recycle stream; and (b) cracking the crackable recycle stream in the second reactor (2) with WHSV of 0-40 hr$^{-1}$ to obtain light olefins.

The present disclosure discloses a process for the fluid catalytic cracking of a hydrocarbon feedstock, which comprises: (a) contacting the hydrocarbon feedstock with a catalyst composition comprising: 70-95% of a non-zeolitic material; 3-18% of zeolite-1, and 2-12 wt % of zeolite-2 selected from a group consisting of ZSM-5, ZSM-11, ZSM-22, SAPO-11, and combinations thereof and is modified with phosphorous, alkaline earth, transition elements, in a Fluid Catalytic Cracking (FCC) apparatus, in the presence of steam at a temperature in the range of from 550 to 600° C., pressure in the range of from 0.5 to 2.0 kg/cm$^2$, catalyst composition-to-hydrocarbon feedstock ratio of 10 to 20% by weight, riser residence time of 2 to 5 sec, and steam-to-hydrocarbon feedstock ratio of 5 to 40% by weight, thereby cracking the hydrocarbon feedstock in the first reactor (1) to obtain a crackable recycle stream; and (b) cracking the crackable recycle stream in the second reactor (2) with WHSV of 0-40 hr$^{-1}$ to obtain light olefins.

The present disclosure discloses a process for the fluid catalytic cracking of a hydrocarbon feedstock, which comprises: (a) contacting the hydrocarbon feedstock with a catalyst composition comprising: 70-95% of a non-zeolitic material; 3-18% of zeolite-1, and 2-12 wt % of zeolite-2 selected from a group consisting of ZSM-5, ZSM-11, ZSM-22, SAPO-11, and combinations thereof and is modified with phosphorous, alkaline earth, Fe, Zn or Mn, in a Fluid Catalytic Cracking (FCC) apparatus, in the presence of steam at a temperature in the range of from 550 to 600° C., pressure in the range of from 0.5 to 2.0 kg/cm$^2$, catalyst composition-to-hydrocarbon feedstock ratio of 10 to 20% by weight, riser residence time of 2 to 5 sec, and steam-to-hydrocarbon feedstock ratio of 5 to 40% by weight, thereby cracking the hydrocarbon feedstock in the first reactor (1) to obtain a crackable recycle stream; and (b) cracking the crackable recycle stream in the second reactor (2) with WHSV of 0-40 hr$^{-1}$ to obtain light olefins.

The present disclosure discloses a process for the fluid catalytic cracking of a hydrocarbon feedstock, which comprises: (a) contacting the hydrocarbon feedstock with a catalyst composition comprising: 70-95% of a non-zeolitic material; 3-18% of zeolite-1, and 2-12 wt % of zeolite-2 having a pore size in the range of 5-6° A and selected from a group consisting of ZSM-5, ZSM-11, ZSM-22, SAPO-11, and combinations thereof and is modified with phosphorous, alkaline earth, transition elements, in a Fluid Catalytic Cracking (FCC) apparatus, in the presence of steam at a temperature in the range of from 550 to 600° C., pressure in the range of from 0.5 to 2.0 kg/cm$^2$, catalyst composition-to-hydrocarbon feedstock ratio of 10 to 20% by weight, riser residence time of 2 to 5 sec, and steam-to-hydrocarbon feedstock ratio of 5 to 40% by weight, thereby cracking the hydrocarbon feedstock in the first reactor (1) to obtain a crackable recycle stream; and (b) cracking the crackable recycle stream in the second reactor (2) with WHSV of 0-40 hr$^{-1}$ to obtain light olefins.

The present disclosure discloses a process for the fluid catalytic cracking of a hydrocarbon feedstock, which comprises: (a) contacting the hydrocarbon feedstock with a catalyst composition comprising: 70-95% of a non-zeolitic material having a combination of active and inactive material; 3-18% of zeolite-11 having a pore size in the range of 7-8° A, and 2-12 wt % of zeolite-21 having a pore size in the range of 5-6° A, in a Fluid Catalytic Cracking (FCC) apparatus, in the presence of steam at a temperature in the range of from 550 to 600° C., pressure in the range of from 0.5 to 2.0 kg/cm$^2$, catalyst composition-to-hydrocarbon feedstock ratio of 10 to 20% by weight, riser residence time of 2 to 5 sec, and steam-to-hydrocarbon feedstock ratio of 5 to 40% by weight, thereby cracking the hydrocarbon feedstock in the first reactor (1) to obtain a crackable recycle stream; and (b) cracking the crackable recycle stream in the second reactor (2) with WHSV of 0-40 hr$^{-1}$ to obtain light olefins.

The present disclosure discloses a process for the fluid catalytic cracking of a hydrocarbon feedstock, which comprises: (a) contacting the hydrocarbon feedstock with a catalyst composition comprising: 70-95% of a non-zeolitic material having a combination of active and inactive material; 3-18% of zeolite-1 selected from a group consisting of Ultra-Stable Y (USY), Rare Earth exchanged USY (RE- USY), Beta, and combinations thereof, and 2-12 wt % of zeolite-2 selected from a group consisting of ZSM-5, ZSM-11, ZSM-22, SAPO-11, and combinations thereof and is modified with phosphorous, alkaline earth, transition elements, in a Fluid Catalytic Cracking (FCC) apparatus, in the presence of steam at a temperature in the range of from 550 to 600° C., pressure in the range of from 0.5 to 2.0 kg/cm$^2$, catalyst composition-to-hydrocarbon feedstock ratio of 10 to 20% by weight, riser residence time of 2 to 5 sec, and steam-to-hydrocarbon feedstock ratio of 5 to 40% by weight, thereby cracking the hydrocarbon feedstock in the first reactor (1) to obtain a crackable recycle stream; and (b) cracking the crackable recycle stream in the second reactor (2) with WHSV of 0-40 hr$^{-1}$ to obtain light olefins.

The present disclosure discloses a process for the fluid catalytic cracking of a hydrocarbon feedstock, which comprises: (a) contacting the hydrocarbon feedstock with a catalyst composition comprising: 70-95% of a non-zeolitic material having a combination of active and inactive material; 3-18% of zeolite-1 having a pore size in the range of 7-8° A and selected from a group consisting of Ultra-Stable Y (USY), Rare Earth exchanged USY (REUSY), Beta, and combinations thereof, and 2-12 wt % of zeolite-2 having a pore size in the range of 5-6° A and selected from a group consisting of ZSM-5, ZSM-11, ZSM-22, SAPO-11, and combinations thereof and is modified with phosphorous, alkaline earth, transition elements, in a fluid catalytic cracking (FCC) apparatus, in the presence of steam at a temperature in the range of from 550 to 600° C., pressure in the range of from 0.5 to 2.0 kg/cm$^2$, catalyst composition-to-hydrocarbon feedstock ratio of 10 to 20% by weight, riser residence time of 2 to 5 sec, and steam-to-hydrocarbon feedstock ratio of 5 to 40% by weight, thereby cracking the hydrocarbon feedstock in the first reactor (1) to obtain a crackable recycle stream; and (b) cracking the crackable recycle stream in the second reactor (2) with WHSV of 0-40 hr$^{-1}$ to obtain light olefins.

The present disclosure discloses a process for the fluid catalytic cracking of a hydrocarbon feedstock, which comprises: (a) contacting the hydrocarbon feedstock with a catalyst composition comprising: 70-95% of a non-zeolitic material having a combination of active and inactive material; 3-18% of zeolite-1 having a pore size in the range of 7-8° A and selected from a group consisting of Ultra-Stable Y (USY), Rare Earth exchanged USY (REUSY), Beta, and combinations thereof, and 2-12 wt % of zeolite-2 having a pore size in the range of 5-6° A and selected from a group consisting of ZSM-5, ZSM-11, ZSM-22, SAPO-11, and combinations thereof and is modified with phosphorous, alkaline earth, Fe, Zn or Mn, in a fluid catalytic cracking (FCC) apparatus, in the presence of steam at a temperature in the range of from 550 to 600° C., pressure in the range of from 0.5 to 2.0 kg/cm$^2$, catalyst composition-to-hydrocarbon feedstock ratio of 10 to 20% by weight, riser residence time of 2 to 5 sec, and steam-to-hydrocarbon feedstock ratio of 5 to 40% by weight, thereby cracking the hydrocarbon feedstock in the first reactor (1) to obtain a crackable recycle stream; and (b) cracking the crackable recycle stream in the second reactor (2) with WHSV of 0-40 hr$^{-1}$ to obtain light olefins.

The present disclosure discloses a process for the fluid catalytic cracking of a hydrocarbon feedstock, which comprises: (a) contacting the hydrocarbon feedstock with a catalyst composition comprising: 70-98% of a non-zeolitic material; and 2-30% of at least one zeolite material; the percentage being based on weight of the catalyst composition, in a Fluid Catalytic Cracking (FCC) apparatus, in the presence of steam at a temperature in the range of from 550 to 600° C., pressure in the range of from 0.5 to 2.0 kg/cm$^2$, catalyst composition-to-hydrocarbon feedstock ratio of 10 to 20% by weight, riser residence time of 2 to 5 sec, and steam-to-hydrocarbon feedstock ratio of 5 to 40% by weight, thereby cracking the hydrocarbon feedstock in the first reactor (1) to obtain a crackable recycle stream; and (b) cracking the crackable recycle stream in the second reactor (2) with WHSV of 0-40 hr$^{-1}$ to obtain light olefins; wherein the light olefins are selected from ethylene, propylene, and butylenes.

The present disclosure discloses a process for the fluid catalytic cracking of a hydrocarbon feedstock, which comprises: (a) contacting the hydrocarbon feedstock with a catalyst composition comprising: 70-98% of a non-zeolitic material in a combination of active and inactive material; and 2-30% of at least one zeolite material; the percentage being based on weight of the catalyst composition, in a Fluid Catalytic Cracking (FCC) apparatus, in the presence of steam at a temperature in the range of from 550 to 600° C., pressure in the range of from 0.5 to 2.0 kg/cm$^2$, catalyst composition-to-hydrocarbon feedstock ratio of 10 to 20% by weight, riser residence time of 2 to 5 sec, and steam-to-hydrocarbon feedstock ratio of 5 to 40% by weight, thereby cracking the hydrocarbon feedstock in the first reactor (1) to obtain a crackable recycle stream; and (b) cracking the crackable recycle stream in the second reactor (2) with WHSV of 0-40 hr$^{-1}$ to obtain light olefins; wherein the light olefins are selected from ethylene, propylene, and butylenes.

The present disclosure discloses a process for the fluid catalytic cracking of a hydrocarbon feedstock, which comprises: (a) contacting the hydrocarbon feedstock with a catalyst composition comprising: 70-98% of a non-zeolitic material; and 2-30% of at least one zeolite material selected from zeolite-1, zeolite-2, and combinations thereof; the percentage being based on weight of the catalyst composition, in a Fluid Catalytic Cracking (FCC) apparatus, in the presence of steam at a temperature in the range of from 550 to 600° C., pressure in the range of from 0.5 to 2.0 kg/cm$^2$, catalyst composition-to-hydrocarbon feedstock ratio of 10 to 20% by weight, riser residence time of 2 to 5 sec, and steam-to-hydrocarbon feedstock ratio of 5 to 40% by weight, thereby cracking the hydrocarbon feedstock in the first reactor (1) to obtain a crackable recycle stream; and (b) cracking the crackable recycle stream in the second reactor (2) with WHSV of 0-40 hr$^{-1}$ to obtain light olefins; wherein the light olefins are selected from ethylene, propylene, and butylenes.

The present disclosure discloses a process for the fluid catalytic cracking of a hydrocarbon feedstock, which comprises: (a) contacting the hydrocarbon feedstock with a catalyst composition comprising: 70-95% of a non-zeolitic material; and 3-18% of zeolite-1, and 2-12% of zeolite-2; the percentage being based on weight of the catalyst composition, in a Fluid Catalytic Cracking (FCC) apparatus, in the presence of steam at a temperature in the range of from 550 to 600° C., pressure in the range of from 0.5 to 2.0 kg/cm$^2$, catalyst composition-to-hydrocarbon feedstock ratio of 10 to 20% by weight, riser residence time of 2 to 5 sec, and steam-to-hydrocarbon feedstock ratio of 5 to 40% by weight, thereby cracking the hydrocarbon feedstock in the first reactor (1) to obtain a crackable recycle stream; and (b) cracking the crackable recycle stream in the second reactor (2) with WHSV of 0-40 hr$^{-1}$ to obtain light olefins; wherein the light olefins are selected from ethylene, propylene, and butylenes.

The present disclosure discloses a process for the fluid catalytic cracking of a hydrocarbon feedstock, which comprises: (a) contacting the hydrocarbon feedstock with a catalyst composition comprising: 70-95% of a non-zeolitic material wherein the non-zeolitic material is a combination of active and inactive material; and 3-18% of zeolite-1 having a pore size in the range of 7-8° A and selected from a group consisting of Ultra-Stable Y (USY), Rare Earth exchanged USY (REUSY), Beta, and combinations thereof, and 2-12% of zeolite-2 having a pore size in the range of 5-6° A and is selected from a group consisting of ZSM-5, ZSM-11, ZSM-22, SAPO-11, and combinations thereof and is modified with phosphorous, alkaline earth, transition elements; the percentage being based on weight of the catalyst composition, in a Fluid Catalytic Cracking (FCC) apparatus, in the presence of steam at a temperature in the range of from 550 to 600° C., pressure in the range of from 0.5 to 2.0 kg/cm$^2$, catalyst composition-to-hydrocarbon feedstock ratio of 10 to 20% by weight, riser residence time of 2 to 5 sec, and steam-to-hydrocarbon feedstock ratio of 5 to 40% by weight, thereby cracking the hydrocarbon feedstock in the first reactor (1) to obtain a crackable recycle stream; and (b) cracking the crackable recycle stream in the second reactor (2) with WHSV of 0-40 hr$^{-1}$ to obtain light olefins; wherein the light olefins are selected from ethylene, propylene, and butylenes.

The present disclosure discloses a process for the fluid catalytic cracking of a hydrocarbon feedstock, which comprises: (a) contacting the hydrocarbon feedstock with a catalyst composition comprising: 70-95% of a non-zeolitic material wherein the non-zeolitic material is a combination of active and inactive material; and 3-18% of zeolite-1 having a pore size in the range of 7-8° A and selected from a group consisting of Ultra-Stable Y (USY), Rare Earth exchanged USY (REUSY), Beta, and combinations thereof, and 2-12% of zeolite-2 having a pore size in the range of 5-6° A and is selected from a group consisting of ZSM-5, ZSM-11, ZSM-22, SAPO-11, and combinations thereof and is modified with phosphorous, alkaline earth, Fe, Zn or Mn; the percentage being based on weight of the catalyst composition, in a Fluid Catalytic Cracking (FCC) apparatus, in the presence of steam at a temperature in the range of from 550 to 600° C., pressure in the range of from 0.5 to 2.0 kg/cm$^2$, catalyst composition-to-hydrocarbon feedstock ratio of 10 to 20% by weight, riser residence time of 2 to 5 sec, and steam-to-hydrocarbon feedstock ratio of 5 to 40% by weight, thereby cracking the hydrocarbon feedstock in the first reactor (1) to obtain a crackable recycle stream; and (b) cracking the crackable recycle stream in the second reactor (2) with WHSV of 0-40 hr$^{-1}$ to obtain light olefins; wherein the light olefins are selected from ethylene, propylene, and butylenes.

The present disclosure discloses a process for the fluid catalytic cracking of a hydrocarbon feedstock, which comprises: (a) contacting the hydrocarbon feedstock with a catalyst composition comprising: 70-98% of a non-zeolitic material; and 2-30% of at least one zeolite material; the percentage being based on weight of the catalyst composition, in a Fluid Catalytic Cracking (FCC) apparatus, in the presence of steam at a temperature in the range of from 550 to 600° C., pressure in the range of from 0.5 to 2.0 kg/cm$^2$, catalyst composition-to-hydrocarbon feedstock ratio of 10 to 20% by weight, riser residence time of 2 to 5 sec, and steam-to-hydrocarbon feedstock ratio of 5 to 40% by weight, thereby cracking the hydrocarbon feedstock in the first reactor (1) to obtain a crackable recycle stream; and (b) cracking the crackable recycle stream in the second reactor (2) with WHSV of 0-40 hr$^{-1}$ to obtain light olefins; wherein the light olefins are selected from ethylene, propylene, and butylenes; wherein the ethylene yield is in the range of 3-6 wt %, propylene yield is in the range of 15-21% wt %, and the butylenes yield is 11-14% wt %, each of the yields is based on the feedstock.

The present disclosure discloses a process for the fluid catalytic cracking of a hydrocarbon feedstock, which comprises: (a) contacting the hydrocarbon feedstock with a catalyst composition comprising: 70-98% of a non-zeolitic material in a combination of active and inactive material; and 2-30% of at least one zeolite material; the percentage being based on weight of the catalyst composition, in a Fluid Catalytic Cracking (FCC) apparatus, in the presence of steam at a temperature in the range of from 550 to 600° C., pressure in the range of from 0.5 to 2.0 kg/cm$^2$, catalyst composition-to-hydrocarbon feedstock ratio of 10 to 20% by weight, riser residence time of 2 to 5 sec, and steam-to-hydrocarbon feedstock ratio of 5 to 40% by weight, thereby cracking the hydrocarbon feedstock in the first reactor (1) to obtain a crackable recycle stream; and (b) cracking the crackable recycle stream in the second reactor (2) with WHSV of 0-40 hr$^{-1}$ to obtain light olefins; wherein the light olefins are selected from ethylene, propylene, and butylenes wherein the ethylene yield is in the range of 3-6 wt %, propylene yield is in the range of 15-21% wt %, and butylenes yield is 11-14% wt %, each of the yields is based on the feedstock.

The present disclosure discloses a process for the fluid catalytic cracking of a hydrocarbon feedstock, which comprises: (a) contacting the hydrocarbon feedstock with a catalyst composition comprising: 70-98% of a non-zeolitic material; and 2-30% of at least one zeolite material selected from zeolite-1, zeolite-2, and combinations thereof; the percentage being based on weight of the catalyst composition, in a Fluid Catalytic Cracking (FCC) apparatus, in the presence of steam at a temperature in the range of from 550 to 600° C., pressure in the range of from 0.5 to 2.0 kg/cm$^2$, catalyst composition-to-hydrocarbon feedstock ratio of 10 to 20% by weight, riser residence time of 2 to 5 sec, and steam-to-hydrocarbon feedstock ratio of 5 to 40% by weight, thereby cracking the hydrocarbon feedstock in the first reactor (1) to obtain a crackable recycle stream; and (b) cracking the crackable recycle stream in the second reactor (2) with WHSV of 0-40 hr$^{-1}$ to obtain light olefins; wherein the light olefins are selected from ethylene, propylene, and butylenes; wherein the ethylene yield is in the range of 3-6 wt %, propylene yield is in the range of 15-21% wt %, and the butylenes yield is 11-14% wt %, each of the yields is based on the feedstock.

The present disclosure discloses a process for the fluid catalytic cracking of a hydrocarbon feedstock, which comprises: (a) contacting the hydrocarbon feedstock with a catalyst composition comprising: 70-95% of a non-zeolitic material; and 3-18% of zeolite-1, and 2-12% of zeolite-2; the percentage being based on weight of the catalyst composition, in a Fluid Catalytic Cracking (FCC) apparatus, in the presence of steam at a temperature in the range of from 550 to 600° C., pressure in the range of from 0.5 to 2.0 kg/cm$^2$, catalyst composition-to-hydrocarbon feedstock ratio of 10 to 20% by weight, riser residence time of 2 to 5 sec, and steam-to-hydrocarbon feedstock ratio of 5 to 40% by weight, thereby cracking the hydrocarbon feedstock in the first reactor (1) to obtain a crackable recycle stream; and (b) cracking the crackable recycle stream in the second reactor (2) with WHSV of 0-40 hr$^{-1}$ to obtain light olefins; wherein the light olefins are selected from ethylene, propylene, and butylenes; wherein the ethylene yield is in the range of 3-6 wt %, propylene yield is in the range of 15-21% wt %, and the butylenes yield is 11-14% wt %, each of the yields is based on the feedstock.

The present disclosure discloses a process for the fluid catalytic cracking of a hydrocarbon feedstock, which comprises: (a) contacting the hydrocarbon feedstock with a catalyst composition comprising: 70-95% of a non-zeolitic material wherein the non-zeolitic material is a combination of active and inactive material; and 3-18% of zeolite-1 having a pore size in the range of 7-8° A and selected from a group consisting of Ultra-Stable Y (USY), Rare Earth exchanged USY (REUSY), Beta, and combinations thereof, and 2-12% of zeolite-2 having a pore size in the range of 5-6° A and is selected from a group consisting of ZSM-5, ZSM-11, ZSM-22, SAPO-11, and combinations thereof and is modified with phosphorous, alkaline earth, transition elements; the percentage being based on weight of the catalyst composition, in a Fluid Catalytic Cracking (FCC) apparatus, in the presence of steam at a temperature in the range of from 550 to 600° C., pressure in the range of from 0.5 to 2.0 kg/cm$^2$, catalyst composition-to-hydrocarbon feedstock ratio of 10 to 20% by weight, riser residence time of 2 to 5 sec, and steam-to-hydrocarbon feedstock ratio of 5 to 40% by weight, thereby cracking the hydrocarbon feedstock in the first reactor (1) to obtain a crackable recycle stream; and (b) cracking the crackable recycle stream in the second reactor (2) with WHSV of 0-40 hr$^{-1}$ to obtain light olefins; wherein the light olefins are selected from ethylene, propylene, and butylenes; wherein the ethylene yield is in the range of 3-6 wt %, propylene yield is in the range of 15-21% wt %, and the butylenes yield is 11-14% wt %, each of the yields is based on the feedstock.

The present disclosure discloses a process for the fluid catalytic cracking of a hydrocarbon feedstock, which comprises: (a) contacting the hydrocarbon feedstock with a catalyst composition comprising: 70-95% of a non-zeolitic material wherein the non-zeolitic material is a combination of active and inactive material; and 3-18% of zeolite-1 having a pore size in the range of 7-8° A and selected from a group consisting of Ultra-Stable Y (USY), Rare Earth exchanged USY (REUSY), Beta, and combinations thereof, and 2-12% of zeolite-2 having a pore size in the range of 5-6° A and is selected from a group consisting of ZSM-5, ZSM-11, ZSM-22, SAPO-11, and combinations thereof and is modified with phosphorous, alkaline earth, Fe, Zn or Mn; the percentage being based on weight of the catalyst composition, in a Fluid Catalytic Cracking (FCC) apparatus, in the presence of steam at a temperature in the range of from 550 to 600° C., pressure in the range of from 0.5 to 2.0 kg/cm$^2$, catalyst composition-to-hydrocarbon feedstock ratio of 10 to 20% by weight, riser residence time of 2 to 5 sec, and steam-to-hydrocarbon feedstock ratio of 5 to 40% by weight, thereby cracking the hydrocarbon feedstock in the first reactor (1) to obtain a crackable recycle stream; and (b) cracking the crackable recycle stream in the second reactor (2) with WHSV of 0-40 hr$^{-1}$ to obtain light olefins; wherein the light olefins are selected from ethylene, propylene, and butylenes; wherein the ethylene yield is in the range of 3-6 wt %, propylene yield is in the range of 15-21% wt %, and the butylenes yield is 11-14% wt %, each of the yields is based on the feedstock.

The present disclosure discloses a process for the fluid catalytic cracking of a hydrocarbon feedstock, which comprises: (a) contacting the hydrocarbon feedstock with a catalyst composition comprising: 70-98% of a non-zeolitic material; and 2-30% of at least one zeolite material; the percentage being based on weight of the catalyst composition, in a Fluid Catalytic Cracking (FCC) apparatus, in the presence of steam at a temperature in the range of from 550 to 600° C., pressure in the range of from 0.5 to 2.0 kg/cm$^2$, catalyst composition-to-hydrocarbon feedstock ratio of 10 to 20% by weight, riser residence time of 2 to 5 sec, and steam-to-hydrocarbon feedstock ratio of 5 to 40% by weight, thereby cracking the hydrocarbon feedstock in the first reactor (1) to obtain a crackable recycle stream, wherein the crackable recycle stream are selected from C4 stream, light naphtha, and CLO streams; and (b) cracking the crackable recycle stream in the second reactor (2) with WHSV of 0-40 hr$^{-1}$ to obtain light olefins.

The present disclosure discloses a process for the fluid catalytic cracking of a hydrocarbon feedstock, which comprises: (a) contacting the hydrocarbon feedstock with a catalyst composition comprising: 70-95% of a non-zeolitic material; 3-18% of zeolite-1; and 2-12% of zeolite-2; the percentage being based on weight of the catalyst composition, in a Fluid Catalytic Cracking (FCC) apparatus, in the presence of steam at a temperature in the range of from 550 to 600° C., pressure in the range of from 0.5 to 2.0 kg/cm$^2$, catalyst composition-to-hydrocarbon feedstock ratio of 10 to 20% by weight, riser residence time of 2 to 5 sec, and steam-to-hydrocarbon feedstock ratio of 5 to 40% by weight, thereby cracking the hydrocarbon feedstock in the first reactor (1) to obtain a crackable recycle stream, wherein the crackable recycle stream are selected from C4 stream, light naphtha, and CLO streams; and (b) cracking the crackable recycle stream in the second reactor (2) with WHSV of 0-40 hr$^{-1}$ to obtain light olefins.

The present disclosure discloses a process for the fluid catalytic cracking of a hydrocarbon feedstock, which comprises: (a) contacting the hydrocarbon feedstock with a catalyst composition comprising: 70-98% of a non-zeolitic material; and 2-30% of at least one zeolite material; the percentage being based on weight of the catalyst composition, in a Fluid Catalytic Cracking (FCC) apparatus, in the presence of steam at a temperature in the range of from 550 to 600° C., pressure in the range of from 0.5 to 2.0 kg/cm$^2$, catalyst composition-to-hydrocarbon feedstock ratio of 10 to 20% by weight, riser residence time of 2 to 5 sec, and steam-to-hydrocarbon feedstock ratio of 5 to 40% by weight, thereby cracking the hydrocarbon feedstock in the first reactor (1) to obtain a crackable recycle stream, wherein the hydrocarbon feedstock is selected from the group consisting of hydrotreated Vacuum Gas Oil (VGO), coker gasoline, Coker Fuel Oil (CFO), hydro cracker bottom, Vacuum Gas Oil (VGO), vacuum residue, residue coker oil (RCO), Heavy Vacuum Gas Oil (HVGO), and combinations thereof; and (b) cracking the crackable recycle stream in the second reactor (2) with WHSV of 0-40 hr$^{-1}$ to obtain light olefins.

The present disclosure discloses a process for the fluid catalytic cracking of a hydrocarbon feedstock, which comprises: (a) contacting the hydrocarbon feedstock with a catalyst composition comprising: 70-95% of a non-zeolitic material; 3-18% of zeolite-1; and 2-12% of zeolite-2; the percentage being based on weight of the catalyst composition, in a Fluid Catalytic Cracking (FCC) apparatus, in the presence of steam at a temperature in the range of from 550 to 600° C., pressure in the range of from 0.5 to 2.0 kg/cm$^2$, catalyst composition-to-hydrocarbon feedstock ratio of 10 to 20% by weight, riser residence time of 2 to 5 sec, and steam-to-hydrocarbon feedstock ratio of 5 to 40% by weight, thereby cracking the hydrocarbon feedstock in the first reactor (1) to obtain a crackable recycle stream, wherein the hydrocarbon feedstock is selected from the group consisting of hydrotreated Vacuum Gas Oil (VGO), coker gasoline, Coker Fuel Oil (CFO), hydro cracker bottom, Vacuum Gas Oil (VGO), vacuum residue, Residue Coker Oil (RCO), Heavy Vacuum Gas Oil (HVGO), and combinations thereof; and (b) cracking the crackable recycle stream in the second reactor (2) with WHSV of 0-40 $hr^{-1}$ to obtain light olefins.

The present disclosure discloses a process for the fluid catalytic cracking of a hydrocarbon feedstock, which comprises: (a) contacting the hydrocarbon feedstock with a catalyst composition comprising: 70-98% of a non-zeolitic material; and 2-30% of at least one zeolite material; the percentage being based on weight of the catalyst composition, in a Fluid Catalytic Cracking (FCC) apparatus, in the presence of steam at a temperature in the range of from 550 to 600° C., pressure in the range of from 0.5 to 2.0 $kg/cm^2$, catalyst composition-to-hydrocarbon feedstock ratio of 10 to 20% by weight, riser residence time of 2 to 5 sec, and steam-to-hydrocarbon feedstock ratio of 5 to 40% by weight, thereby cracking the hydrocarbon feedstock in the first reactor (1) to obtain a crackable recycle stream, wherein the hydrocarbon feedstock is hydrotreated Vacuum Gas Oil (VGO); and (b) cracking the crackable recycle stream in the second reactor (2) with WHSV of 0-40 $hr^{-1}$ to obtain light olefins.

The present disclosure discloses a process for the fluid catalytic cracking of a hydrocarbon feedstock, which comprises: (a) contacting the hydrocarbon feedstock with a catalyst composition comprising: 70-95% of a non-zeolitic material; 3-18% of zeolite-1; and 2-12% of zeolite-2; the percentage being based on weight of the catalyst composition, in a Fluid Catalytic Cracking (FCC) apparatus, in the presence of steam at a temperature in the range of from 550 to 600° C., pressure in the range of from 0.5 to 2.0 $kg/cm^2$, catalyst composition-to-hydrocarbon feedstock ratio of 10 to 20% by weight, riser residence time of 2 to 5 sec, and steam-to-hydrocarbon feedstock ratio of 5 to 40% by weight, thereby cracking the hydrocarbon feedstock in the first reactor (1) to obtain a crackable recycle stream, wherein the hydrocarbon feedstock is hydrotreated Vacuum Gas Oil (VGO); and (b) cracking the crackable recycle stream in the second reactor (2) with WHSV of 0-40 $hr^{-1}$ to obtain light olefins.

The present disclosure discloses a process for the fluid catalytic cracking of a hydrocarbon feedstock, which comprises: (a) contacting the hydrocarbon feedstock with a catalyst composition comprising: 70-98% of a non-zeolitic material; and 2-30% of at least one zeolite material; the percentage being based on weight of the catalyst composition, in a Fluid Catalytic Cracking (FCC) apparatus, in the presence of steam at a temperature in the range of from 550 to 600° C., pressure in the range of from 0.5 to 2.0 $kg/cm^2$, catalyst composition-to-hydrocarbon feedstock ratio of 10 to 20% by weight, riser residence time of 2 to 5 sec, and steam-to-hydrocarbon feedstock ratio of 5 to 40% by weight, thereby cracking the hydrocarbon feedstock in the first reactor (1) to obtain a crackable recycle stream; and (b) cracking the crackable recycle stream in the second reactor (2) at a temperature in the range of from 590 to 625° C., a pressure in the range of from 0.5 to 2.0 $kg/cm^2$, and WHSV of 2-20 $hr^{-1}$ to obtain light olefins.

The present disclosure discloses a process for the fluid catalytic cracking of a hydrocarbon feedstock, which comprises: (a) contacting the hydrocarbon feedstock with a catalyst composition comprising: 70-95% of a non-zeolitic material; 3-18% of zeolite-1; and 2-12% of zeolite-2; the percentage being based on weight of the catalyst composition, in a Fluid Catalytic Cracking (FCC) apparatus, in the presence of steam at a temperature in the range of from 550 to 600° C., pressure in the range of from 0.5 to 2.0 $kg/cm^2$, catalyst composition-to-hydrocarbon feedstock ratio of 10 to 20% by weight, riser residence time of 2 to 5 sec, and steam-to-hydrocarbon feedstock ratio of 5 to 40% by weight, thereby cracking the hydrocarbon feedstock in the first reactor (1) to obtain a crackable recycle stream; and (b) cracking the crackable recycle stream in the second reactor (2) at a temperature in the range of from 590 to 625° C., a pressure in the range of from 0.5 to 2.0 $kg/cm^2$, and WHSV of 2-20 $hr^{-1}$ to obtain light olefins.

The present disclosure discloses a process for the fluid catalytic cracking of a hydrocarbon feedstock, which comprises: (a) contacting the hydrocarbon feedstock with a catalyst composition comprising: 70-98% of a non-zeolitic material; and 2-30% of at least one zeolite material; the percentage being based on weight of the catalyst composition, in a Fluid Catalytic Cracking (FCC) apparatus, in the presence of steam at a temperature in the range of from 550 to 600° C., pressure in the range of from 0.5 to 2.0 $kg/cm^2$, catalyst composition-to-hydrocarbon feedstock ratio of 10 to 20% by weight, riser residence time of 2 to 5 sec, and steam-to-hydrocarbon feedstock ratio of 5 to 40% by weight, thereby cracking the hydrocarbon feedstock in the first reactor (1) to obtain a crackable recycle stream, wherein the crackable recycle stream are selected from C4 stream, light naphtha, and CLO streams, wherein the hydrocarbon feedstock is hydrotreated Vacuum Gas Oil (VGO); and (b) cracking the crackable recycle stream in the second reactor (2) at a temperature in the range of from 590 to 625° C., a pressure in the range of from 0.5 to 2.0 $kg/cm^2$, and WHSV of 2-20 $hr^{-1}$ to obtain light olefins.

The present disclosure discloses a process for the fluid catalytic cracking of a hydrocarbon feedstock, which comprises: (a) contacting the hydrocarbon feedstock with a catalyst composition comprising: 70-95% of a non-zeolitic material; 3-18% of zeolite-1; and 2-12% of zeolite-2; the percentage being based on weight of the catalyst composition, in a Fluid Catalytic Cracking (FCC) apparatus, in the presence of steam at a temperature in the range of from 550 to 600° C., pressure in the range of from 0.5 to 2.0 $kg/cm^2$, catalyst composition-to-hydrocarbon feedstock ratio of 10 to 20% by weight, riser residence time of 2 to 5 sec, and steam-to-hydrocarbon feedstock ratio of 5 to 40% by weight, thereby cracking the hydrocarbon feedstock in the first reactor (1) to obtain a crackable recycle stream, wherein the crackable recycle stream are selected from C4 stream, light naphtha, and CLO streams, wherein the hydrocarbon feedstock is hydrotreated Vacuum Gas Oil (VGO); and (b) cracking the crackable recycle stream in the second reactor (2) at a temperature in the range of from 590 to 625° C., a pressure in the range of from 0.5 to 2.0 $kg/cm^2$, and WHSV of 2-20 $hr^{-1}$ to obtain light olefins.

The present disclosure discloses a process for the fluid catalytic cracking of a hydrocarbon feedstock, which comprises: (a) contacting the hydrocarbon feedstock with a catalyst composition comprising: 70-98% of a non-zeolitic material; and 2-30% of at least one zeolite material; the percentage being based on weight of the catalyst composition, in a Fluid Catalytic Cracking (FCC) apparatus, in the presence of steam at a temperature in the range of from 550 to 600° C., pressure in the range of from 0.5 to 2.0 $kg/cm^2$, catalyst composition-to-hydrocarbon feedstock ratio of 10 to 20% by weight, riser residence time of 2 to 5 sec, and steam-to-hydrocarbon feedstock ratio of 5 to 40% by weight, thereby cracking the hydrocarbon feedstock in the first reactor (1) to obtain a crackable recycle stream, wherein the crackable recycle stream are selected from C4 stream, light naphtha, and CLO streams, wherein the hydrocarbon feedstock is hydrotreated Vacuum Gas Oil (VGO); and (b) cracking the crackable recycle stream in the second reactor (2) at a temperature in the range of from 590 to 625° C., a pressure in the range of from 0.5 to 2.0 kg/cm$^2$, and WHSV of 2-20 hr$^{-1}$ to obtain light olefins; wherein the light olefins are selected from ethylene, propylene, and butylenes; wherein the ethylene yield is in the range of 3-6 wt %, propylene yield is in the range of 15-21% wt %, and the butylenes yield is 11-14% wt %, each of the yields is based on the feedstock.

The present disclosure discloses a process for the fluid catalytic cracking of a hydrocarbon feedstock, which comprises: (a) contacting the hydrocarbon feedstock with a catalyst composition comprising: 70-95% of a non-zeolitic material; 3-18% of zeolite-1; and 2-12% of zeolite-2; the percentage being based on weight of the catalyst composition, in a Fluid Catalytic Cracking (FCC) apparatus, in the presence of steam at a temperature in the range of from 550 to 600° C., pressure in the range of from 0.5 to 2.0 kg/cm$^2$, catalyst composition-to-hydrocarbon feedstock ratio of 10 to 20% by weight, riser residence time of 2 to 5 sec, and steam-to-hydrocarbon feedstock ratio of 5 to 40% by weight, thereby cracking the hydrocarbon feedstock in the first reactor (1) to obtain a crackable recycle stream, wherein the crackable recycle stream are selected from C4 stream, light naphtha, and CLO streams, wherein the hydrocarbon feedstock is hydrotreated Vacuum Gas Oil (VGO); and (b) cracking the crackable recycle stream in the second reactor (2) at a temperature in the range of from 590 to 625° C., a pressure in the range of from 0.5 to 2.0 kg/cm$^2$, and WHSV of 2-20 hr$^{-1}$ to obtain light olefins; wherein the light olefins are selected from ethylene, propylene, and butylenes; wherein the ethylene yield is in the range of 3-6 wt %, propylene yield is in the range of 15-21% wt %, and the butylenes yield is 11-14% wt %, each of the yields is based on the feedstock.

The catalyst composition contains preferably less than 0.8 wt % rare earth content, which also helps in suppression of hydrogen transfer reactions.

The present disclosure relates to a catalytic cracking process comprising: (a) introducing a hydrocarbon feedstock into a reaction zone of a catalytic cracking unit comprised of a first reactor (1), a second reactor (2), and a regeneration zone (3), wherein the feedstock is characterized as having a density in the range of 0.7 to 1 gm/cc; (b) catalytically cracking the feedstock in the first reactor (1) at a temperature in the range of from 550 to 600° C., a pressure in the range of from 0.5 to 2.0 kg/cm$^2$, riser residence time of 2 to 5 sec, by causing the feedstock to be in contact with a catalyst composition comprising: 70-98% of a non-zeolitic material; and 2-30% of at least one zeolite material, the percentage being based on weight of the catalyst composition via standpipe (7), to obtain the crackable recycle streams; (c) stripping the crackable recycle streams along with the hydrocarbon trapped in a regenerator (3) via spent catalyst standpipe (9); and (d) cracking the crackable recycle stream in the second reactor (2) with WHSV of 0-40 hr$^{-1}$ to obtain light olefins; wherein the light olefins are selected from ethylene, propylene, and butylene; wherein the ethylene yield is in the range of 3-6 wt %, propylene yield is in the range of 15-21% wt %, and the butylenes yield is 11-14% wt %, each of the yields is based on the feedstock.

The present disclosure relates to an apparatus for enhanced light olefins production in a fluid catalytic cracking unit using the catalyst composition comprising: 70-98% of a non-zeolitic material; and 2-30% of at least one zeolite material, the percentage being based on weight of the catalyst composition.

The catalyst of the present disclosure for the fluid catalytic cracking of a hydrocarbon feedstock is coke selective.

The present disclosure relates to an apparatus for enhanced light olefins production in a fluid catalytic cracking unit using the catalyst composition comprising: 76-86% of a non-zeolitic material; and 14-24% of at least one zeolite material, the percentage being based on weight of the catalyst composition.

In an embodiment of the present disclosure, there is provided an apparatus as described herein, wherein the non-zeolitic material is a combination of active and inactive material.

In an embodiment of the present disclosure, there is provided an apparatus as described herein, wherein the at least one zeolite material is selected from zeolite-1, zeolite-2, and combinations thereof.

The fluid catalytic apparatus disclosed in the instant application consists of two reactor configurations which operate in parallel wherein hydrocarbon feedstock is predominantly cracked in first reactor (1) and crackable recycle streams are cracked in second reactor (2) which operates in dense bed cracking. Feed for the first reactor is VGO, light naphtha, CLO streams while feed for the second reactor could be C4 stream, light naphtha, and CLO stream wherein the second reactor operates at higher temperature than the first reactor.

The fluid catalytic apparatus disclosed in the instant application consists of two reactor configurations which operate in parallel wherein hydrotreated VGO is predominantly cracked in first reactor (1) and crackable recycle streams are cracked in second reactor (2) which operates in dense bed cracking. Feed for the first reactor is VGO, light naphtha, CLO streams while feed for the second reactor could be C4 stream, light naphtha, and CLO streams wherein the second reactor operates at higher temperature than the first reactor.

FIG. 1 is a schematic view of a FCC unit for production of light olefins of the present invention according to an embodiment thereof. The illustrated drawing comprises of a riser-reactor-stripper-regenerator section for the circulation of catalyst. Hot regenerated catalyst flows via regenerated catalyst standpipe 7 to the bottom of the riser reactor 1. The preheated hydrotreated VGO is fed to the riser reactor 1 through feed nozzle 4 which atomizes it to fine droplets. The hot catalyst comes in contact with the hydrocarbon feed and gets vaporized and gets cracked in riser reactor 1. The cracking results in coke deposition on the catalyst. The rising catalyst and cracked vapors are separated in riser termination device & reactor cyclones in the disengaging section of riser reactor 1. The catalyst free hydrocarbon vapors exit through reactor vapor line 12. The spent catalyst along with hydrocarbon trapped is stripped by stripping steam and flows to regenerator 3 via spent catalyst standpipe 9. In the regenerator 3, the spent catalyst is regenerated by burning off coke in presence of air 6. The catalyst particles entrained along with flue gas is separated in primary & secondary cyclones housed in regenerator 3. The catalyst free flue gas exit through flue gas line 11 and separated catalyst is fed back to the catalyst bed of regenerator.

A part of hot regenerated catalyst from regenerator 3 is also used to crack olefinic naphtha & C4 hydrocarbon stream in another dense bed riser reactor 2. The hot regenerated catalyst flows via regenerated catalyst standpipe 8 to reactor 2. The hot catalyst is lifted by lift steam, C4 stream & light naphtha is injected through nozzles 5 in the dense bed riser. The entrained catalyst along with vapors is separated in reactor cyclones located in the reactor 2. The vapors exit through reactor vapor line 13. The spent catalyst from reactor 2 is stripped by stripping steam and stripped spent catalyst flows to regenerator 3 via spent catalyst standpipe 10.

The fluid catalytic cracking process & apparatus gives enhanced light olefins, wherein ethylene yield=>6 wt %, propylene yield=>21% and butylenes=>14% on feed basis are obtained.

The process disclosed in the instant application gives enhanced C2, C3 & C4 light olefins, where LPG obtained is 40 to 45 wt %, propylene selectivity in LPG is 40 to 50 wt %, ethylene selectivity is 60 to 70 wt % in dry gas, and butylene selectivity is 30-40 wt % in LPG.

EXAMPLES

The disclosure will now be illustrated with working examples, which is intended to illustrate the working of disclosure and not intended to take restrictively to imply any limitations on the scope of the present disclosure. Other examples are also possible which are within the scope of the present disclosure.

Hydrocarbon Feedstock:

Feed stock for the present invention includes a wide range of hydrocarbon feedstock such as hydrotreated Vacuum Gas Oil (VGO), Coker gasoline, CFO, VGO, hydro cracker bottom, Vacuum Residue, RCO, HVGO and their mixtures, etc. The detail properties of the hydrocarbon feed (hydrotreated VGO) are listed in Table 1.

TABLE 1

| Feed Properties. | |
|---|---|
| Properties | Hydrotreated-VGO |
| Density at 15° C., gm/cc | 0.903 |
| Sulphur, wt % | 0.01 |
| CCR, wt % | <0.1 |
| Pour point, ° C. | 39 |
| Viscosity, cSt | 6.9374 |
| ASTM-7169 Distillation, wt % | |
| IBP | 250 |
| 5 | 338 |
| 10 | 362 |
| 30 | 410 |
| 50 | 443 |
| 70 | 481 |
| 90 | 537 |
| 95 | 561 |
| SARA, wt % | |
| Saturates | 51.6 |
| Aromatics | 42.1 |
| Resin | 6.3 |
| Asphaltenes | Nil |

Catalyst:

The catalyst compositions disclosed in the instant application have different zeolite types either formed separately or blended in same catalyst. Table 2 gives the comparison between normal FCC catalyst & the catalyst composition of the present invention. Non-zeolitic material is the combination of active as well as inactive material. Zeolite-1 has a pore size in the range of 7-8° A and is selected from group of USY, REUSY, Beta etc. Zeolite-2 has a pore size in the range of 5-6° A and is selected from the group of ZSM-5, ZSM-11, ZSM-22, SAPO-11, etc., which is either modified with phosphorous, alkaline earth, Fe, Zn or Mn to create mesoporosity.

TABLE 2

| Comparison of Normal FCC catalyst & catalyst system of the present application (Zeolite content Basis). | | |
|---|---|---|
| Parameter | Existing FCC Catalyst | Catalyst composition of the instant application |
| Non Zeolitic material, wt % | 70-60 | 95-70 |
| Zeolite-1, wt % | 20-40 | 3-18 |
| Zeolite-2, wt % | 10-0 | 2-12 |

Typical Product Yields:

The typical product of the present invention is given in below Table 3. LPG yield of 40-45 wt % with propylene selectivity of 40-50 wt % is obtained.

TABLE 3

| Product yields of the present invention | |
|---|---|
| Attribute | Yields, wt % |
| Coke | 4-7 |
| Dry Gas | 6-9 |
| LPG | 40-45 |
| C3= | 18-22 |
| Gasoline(C5-221° C.) | 25-35 |
| LCO(221-343° C.) | 6-12 |
| Bottoms(343° C.+) | 0.5-7 |

Example 1: Preparation of Catalyst Composition 84 wt % of a non-zeolitic material was mixed with 12 wt % of zeolite-1, and 4 wt % of zeolite-2 to obtain a slurry. The slurry was spray dried to micro-spheres. The micro-spheres were calcined at 500-600° C. for 1-2 hours to obtain the catalyst composition.

Example 2: Preparation of Catalyst Composition 80 wt % of a non-zeolitic material was mixed with 12 wt % of zeolite-1, and 8 wt % of zeolite-2 to obtain a slurry. The slurry was spray dried to micro-spheres. The micro-spheres were calcined at 500-600° C. for 1-2 hours to obtain the catalyst composition.

Example 3

The catalytic cracking experiments were carried out in a fixed fluid bed reactor unit. The cracking reactions were performed at temperature of 570° C. and variable time on stream (30-75 secs) with hydrotreated VGO. Catalyst/Oil ratio was varied between 10 to 16 wt/wt. The gaseous products were analyzed by online GC & Liquid products were analyzed by ASTM 2887 in LT Simdis supplied by AC Analytical Controls. The liquid product cuts considered were Gasoline (C5-221° C.), LCO (221-343° C.) & Bottoms (343° C.+). Conversion was obtained by sum of yields of dry gas, LPG, Gasoline & Coke. The catalyst used for the cracking reactions are steam deactivated fresh FCC catalyst. Hydrothermal deactivation was done at 815° C. for 10 hrs in presence of 100% steam. The typical steam deactivated fresh catalyst properties are listed in Table 4.

TABLE 4

Properties of steam deactivated FCC catalyst

| Parameter | FCC Catalyst |
|---|---|
| Surface area, m$^2$/gm | 140-160 |
| PV, cc/gm | 0.3-0.35 |
| ZSA, m$^2$/gm | 80-100 |
| MSA, m$^2$/gm | 50-60 |
| Rare earth, wt % | 2-2.5 |
| APS, micron | 70-75 |
| ABD, gm/cc | 0.75-0.8 |
| Attrition Index, wt % | 3-5 |

Product yields for catalytic cracking runs with steam deactivated FCC catalyst & with blend of FCC catalyst & ZSM-5 (80:20) at a constant conversion of 85 wt % is given in Table-5. This example illustrates that addition of ZSM-5 is a must to enhance light olefins yield & selectivity. Ethylene, propylene & butylenes obtained with this blend are 5.09 wt %, 15.21 wt % & 9.84 wt % respectively.

TABLE 5

Product yields with FCC catalyst & with blend of FCC catalyst & ZSM-5

| Parameter | FCC Catalyst | FCC Catalyst &ZSM-5 (80:20) |
|---|---|---|
| Cracking Temperature, ° C. | 570 | 570 |
| Conversion, wt % | 85 | 85 |
| Product Yields, wt %: | | |
| Coke | 6.72 | 6.45 |
| Dry Gas | 4.27 | 7.80 |
| Ethylene | 1.36 | 5.09 |
| LPG | 27.49 | 38.97 |
| Propylene | 8.36 | 15.21 |
| Butylenes | 8.22 | 9.84 |
| Gasoline | 46.52 | 31.78 |
| LCO | 9.84 | 9.08 |
| Bottoms | 5.16 | 5.92 |

Example 4

Example 3 is typical for FCC configuration, where steam is 4 to 5 wt % on fresh feed basis. In the present invention, the light olefins enhancement requires low reactor pressures & low partial pressure of the hydrocarbons. Therefore, steam required is more than 5 wt % and such high amount of steam leads to activity loss of catalyst.

The example illustrates catalytic cracking experiments with 100% non zeolitic material & combination of non zeolitic material & zeolite-1 (84:16). Hydrothermal deactivation was done at 815° C. for 10 hrs in presence of 100% steam. The non zeolitic material is mesoporous active matrix that helps to sustain the activity under steam environment and also has hydrocarbon cracking potential as observed in Table 6. This material gives conversion of 66.20 wt % at catalyst to oil ratio of 12 & reaction temperature of 570° C. with hydrotreated VGO as feedstock. Cracking with combination of non zeolitic material & zeolite-1 improves the activity of the catalyst with bottom reduction from 18.85 wt % to 6.99 wt %. However, the yields of ethylene, propylene & butylenes are not high.

TABLE 6

Product yields with non zeolitic material & with combination of zeolite-1

| Parameter | Non Zeolite | Non Zeolite& Zeolite-1 (84:16) |
|---|---|---|
| Cracking Temperature, ° C. | 570 | 570 |
| Catalyst-to-Oil, wt/wt | 12 | 12 |
| Conversion, wt % | 66.2 | 82.71 |
| Product Yields, wt %: | | |
| Coke | 5.55 | 6.08 |
| Dry Gas | 4.23 | 3.82 |
| Ethylene | 1.26 | 1.19 |
| LPG | 18.66 | 24.65 |
| Propylene | 7.27 | 8.33 |
| Butylenes | 9.44 | 9.99 |
| Gasoline | 37.76 | 48.16 |
| LCO | 15.19 | 10.3 |
| Bottoms | 18.61 | 6.99 |

Example 5

This example illustrates the combination of non-zeolite, zeolite-1 & zeolite-2. Zeolite-2 is introduced in the above combination to enhance light olefins. Table 7 shows cracking of hydrotreated VGO with combination of non-zeolite, zeolite-1 and zeolite-2 in the ratio 84:12:4 & 80:12:8 and Table 8 shows the typical properties. Combination 84:12:4 shows increase in ethylene, propylene, butylenes & bottoms as compared with Example 4. However, combination of 80:12:8 shows increased light olefins yield & selectivity with less bottoms as compared with Example 4. Also at a constant conversion of 85 wt % light olefin yields & selectivity is higher compared to Example 3. Increasing zeolite-2 to more than 8 wt % leads to decrease in coke yield, increase in bottoms, dilution effect and creates heat balance issues of the unit.

TABLE 7

Product yields with catalyst system of the present disclosure.

| Parameter | Non zeolite:zeolite-1:zeolite-2 | |
|---|---|---|
| Composition, wt % | 84:12:4 | 80:12:8 |
| Cracking Temperature, ° C. | 570 | 570 |
| Catalyst-to-Oil, wt/wt | 12 | 12 |
| Conversion, wt % | 81.52 | 85 |
| Product Yields, wt %: | | |
| Coke | 5.93 | 5.63 |
| Dry Gas | 6.56 | 8.29 |
| Ethylene | 4.04 | 5.72 |
| LPG | 36.35 | 41.05 |
| Propylene | 16.32 | 19.54 |
| C4 Olefins | 11.81 | 13.87 |
| Gasoline | 32.68 | 30.03 |
| LCO | 12.03 | 9.35 |
| Bottoms | 6.45 | 5.65 |

TABLE 8

Properties of catalyst system of the present invention

| Parameter | Values |
|---|---|
| Fresh surface area, m$^2$/gm | 150-200 |
| Steamed surface area, m$^2$/gm | 110-150 |
| PV, cc/gm | 0.35-0.4 |
| Rare earth, wt % | 0.3-1 |

TABLE 8-continued

Properties of catalyst system of the present invention

| Parameter | Values |
|---|---|
| APS, micron | 75-80 |
| ABD, gm/cc | 0.8-0.85 |
| Attrition Index, wt % | <3 |

Example 6

This example illustrates the effect of cracking recycle streams like light naphtha, C4 stream in dense bed riser at reaction temperature of 600° C. Light olefins can be further maximized by this option in the FCC configuration of the present invention. The results give delta increase in ethylene, propylene, & butylenes are shown in Table 9.

TABLE 9

Results showing the delta increase in ethylene, propylene, & butylenes.

| Parameter | Non zeolite:zeolite-1:zeolite-2 |
|---|---|
| Composition, wt % | 80:12:8 |
| Delta Yields, wt %: | |
| Ethylene | +0.32 |
| Propylene | +1.91 |
| Butylenes | +0.52 |

Example 7

This example illustrates the catalyst system of the present invention in riser cracking of normal FCC units, having residence time of 2-3 secs (low residence time). Cracking runs at 12 Cat/oil & 570° C. shows that there is drop in conversion, coke, dry gas, LPG & light olefins with increase in bottoms as compared to Example 5. This shows that the catalyst system of the present disclosure is suitable for riser cum dense bed cracking as discussed in Example 5 & 6. Table 10 shows riser cracking of hydrotreated VGO with combination of non-zeolite, zeolite-1 and zeolite-2 in the ratio 80:12:8.

TABLE 10

Product yields with catalyst composition of the present disclosure in riser cracking.

| Parameter | Non zeolite: zeolite-1: zeolite-2 |
|---|---|
| Composition, wt % | 80:12:8 |
| Cracking Temperature, ° C. | 570 |
| Catalyst-to-Oil, wt/wt | 12 |
| Conversion, wt % | 79.86 |
| Product Yields, wt %: | |
| Coke | 5.38 |
| Dry Gas | 6.40 |
| Ethylene | 3.98 |
| LPG | 34.86 |
| Propylene | 15.18 |
| Butylenes | 11.40 |
| Gasoline | 33.32 |
| LCO | 12.75 |
| Bottoms | 7.29 |

Although the subject matter has been described in considerable detail with reference to certain examples and implementations thereof, other implementations are possible. As such, the spirit and scope of the appended claims should not be limited to the description of the preferred examples and implementations contained therein.

We claim:

1. A catalyst composition consisting essentially of:
   70 wt. % to 95 wt. % of a non-zeolitic material;
   3 wt. % to 18 wt. % of at least one zeolite-1 selected from the group consisting of rare earth exchanged USY (REUSY) zeolite and combinations of REUSY zeolite and Beta zeolite; and
   2 wt. % to 12 wt. % of at least one zeolite-2,
   wherein:
   the at least one zeolite-1 contains sufficient rare earth content that the catalyst composition contains 0.3 wt. % to 1 wt. % rare earth content, and
   the respective percentages are based on the weight of the catalyst composition.

2. The catalyst composition as claimed in claim 1, wherein the non-zeolitic material is a combination of active material and inactive material.

3. The catalyst composition as claimed in claim 1, wherein the at least one zeolite-1 has a pore size in a range of 7 Å to 8 Å.

4. The catalyst composition as claimed in claim 1, wherein the at least one zeolite-2 has a pore size in a range of 5 Å to 6 Å and is selected from the group consisting of ZSM-5, ZSM-11, ZSM-22, SAPO-11, and combinations thereof, and is modified with at least one element selected from the group consisting of phosphorus, alkaline earth metals, and transition metals.

5. The catalyst composition as claimed in claim 4, wherein the at least one zeolite-2 has an Si/Al atomic ratio in a range of 25 to 100.

6. The catalyst composition as claimed in claim 5, wherein the at least one zeolite-2 has an Si/Al atomic ratio in a range of 30 to 80.

7. The catalyst composition as claimed in claim 4, wherein the at least one zeolite-2 is modified with at least one alkaline earth metal and at least one transition metal, the content of the at least one zeolite-1 and the at least one zeolite-2 is 20 wt. % or less, and the total surface area of the catalyst composition is 150 m$^2$/g to 200 m$^2$/g.

8. The catalyst composition as claimed in claim 7, wherein the catalyst composition contains less than 0.8 wt. % rare earth content, the at least one alkaline earth metal is selected from the group consisting of Sr, Ba, Ca, and Mg, and the at least one transition metal is selected from the group consisting of Fe, Zn, and Mn.

9. The catalyst composition as claimed in claim 1, wherein:
   the non-zeolitic material is a combination of active material and inactive material;
   the at least one zeolite-1 has a pore size in the range of 7 Å to 8 Å; and
   the at least one zeolite-2 has a pore size in the range of 5 Å to 6 Å and is selected from the group consisting of ZSM-5, ZSM-11, ZSM-22, SAPO-11, and combinations thereof, and is modified with at least one element selected from the group consisting of phosphorus, alkaline earth metals, and transition metals.

10. The catalyst composition as claimed in claim 9, wherein the at least one zeolite-2 is modified with at least one alkaline earth metal and at least one transition metal, the content of the at least one zeolite-1 and the at least one zeolite-2 is 20 wt. % or less, and the total surface area of the catalyst composition is 150 m²/g to 200 m²/g.

11. The catalyst composition as claimed in claim 10, wherein the catalyst composition contains less than 0.8 wt. % rare earth content, the at least one alkaline earth metal is selected from the group consisting of Sr, Ba, Ca, and Mg, and the at least one transition metal is selected from the group consisting of Fe, Zn, and Mn.

12. A method of preparing the catalyst composition as claimed in claim 1, the method comprising the steps of:
    (a) mixing components consisting essentially of 70 wt. % to 95 wt. % of a non-zeolitic material, 3 wt. % to 18 wt. % of at least one zeolite-1, and 2 wt. % to 12 wt. % of at least one zeolite-2 to obtain a slurry, wherein:
    the at least one zeolite-1 is selected from the group consisting of rare earth exchanged USY (REUSY) zeolite and combinations of REUSY zeolite with Beta zeolite, and the at least one zeolite-1 contains sufficient rare earth content that the catalyst composition contains at least 0.3 wt. % rare earth content, and the respective percentages are based on the weight of the catalyst composition;
    (b) spray drying the slurry to micro-spheres; and
    (c) calcining the micro-spheres at 500° C. to 600° C. for 1 hour to 2 hours to obtain the catalyst composition.

13. The method as claimed in claim 12, wherein the non-zeolitic material is a combination of active material and inactive material.

14. The method as claimed in claim 12, wherein the at least one zeolite-1 has a pore size in a range of 7 Å to 8 Å.

15. The method as claimed in claim 12, wherein the at least one zeolite-2 has a pore size in a range of 5 Å to 6 Å and is selected from the group consisting of ZSM-5, ZSM-11, ZSM-22, SAPO-11, and combinations thereof and is modified with at least one element selected from the group consisting of phosphorus, alkaline earth metals, and transition metals.

16. The method as claimed in claim 15, wherein the at least one zeolite-2 is modified with at least one alkaline earth metal and at least one transition metal, the content of the at least one zeolite-1 and the at least one zeolite-2 is 20 wt. % or less, and the total surface area of the catalyst composition is 150 m²/g to 200 m²/g.

17. The method as claimed in claim 16, wherein the catalyst composition contains less than 0.8 wt. % rare earth content, the at least one alkaline earth metal is selected from the group consisting of Sr, Ba, Ca, and Mg, and the at least one transition metal is selected from the group consisting of Fe, Zn, and Mn.

18. A process for the fluid catalytic cracking of a hydrocarbon feedstock, which comprises:
    (a) contacting the hydrocarbon feedstock with a catalyst composition comprising 76 wt. % to 86 wt. % of a non-zeolitic material and 2 wt. % to 24 wt. % of at least one zeolite material, the percentage being based on the weight of the catalyst composition, in a first reactor of a fluid catalytic cracking (FCC) apparatus in the presence of steam at a temperature in the range of from 550° C. to 600° C., a pressure in the range of from 0.5 kg/cm² to 2.0 kg/cm², a catalyst composition-to-hydrocarbon feedstock ratio in a range of 10% to 20% by weight, a riser residence time of 2 sec to 5 sec, and a steam-to-hydrocarbon feedstock ratio in a range of 5% by weight to 40% by weight, thereby cracking the hydrocarbon feedstock to obtain a crackable recycle stream; and
    (b) cracking the crackable recycle stream in a second reactor with a WHSV of up to 40 hr$^{-1}$ to obtain light olefins selected from the group consisting of ethylene, propylene, and butylenes, wherein an ethylene yield is in a range of 3 wt. % to 6 wt. %, a propylene yield is in a range of 15 wt. % to 21 wt. %, and a butylenes yield is in a range of 11 wt. % to 14 wt. %, wherein each of the yields is based on the feedstock.

19. The process as claimed in claim 18, wherein the crackable recycle stream is selected from the group consisting of C4, light naphtha, and CLO streams.

20. The process as claimed in claim 18, wherein the hydrocarbon feedstock is selected from the group consisting of hydrotreated vacuum gas oil (VGO), coker gasoline, coker fuel oil (CFO), hydro cracker bottom, vacuum gas oil (VGO), vacuum residue, residue coker oil (RCO), heavy vacuum gas oil (HVGO), and combinations thereof.

21. The process as claimed in claim 18, comprising cracking the crackable recycle stream in step (b) at a temperature in a range of 590° C. to 625° C., a pressure in the range of 0.5 kg/cm² to 2.0 kg/cm², and a WHSV of 2 hr$^{-1}$ to 20 hr$^{-1}$.

* * * * *

UNITED STATES PATENT AND TRADEMARK OFFICE
CERTIFICATE OF CORRECTION

PATENT NO. : 10,287,511 B2
APPLICATION NO. : 15/535736
DATED : May 14, 2019
INVENTOR(S) : Pramod Kumar et al.

Page 1 of 1

It is certified that error appears in the above-identified patent and that said Letters Patent is hereby corrected as shown below:

On the Title Page

Item (72), Line 8, "Viskhapatnam (IN)" should be -- Visakhapatnam (IN) --.

Signed and Sealed this
Twenty-sixth Day of November, 2019

Andrei Iancu
*Director of the United States Patent and Trademark Office*